(12) United States Patent
Rashid et al.

(10) Patent No.: US 9,429,683 B2
(45) Date of Patent: Aug. 30, 2016

(54) POLYMERS FOR CONTACT LENSES

(71) Applicant: Ocutec Ltd., Bellshill (GB)

(72) Inventors: Abdul Rashid, Bellshill (GB); John Fraser, Bellshill (GB); Gordon Honeyman, Bellshill (GB); Mussarrat Mohammed, Bellshill (GB)

(73) Assignee: OCUTEC LIMITED, Bellshill (GB)

( * ) Notice: Subject to any disclaimer, the term of this patent is extended or adjusted under 35 U.S.C. 154(b) by 0 days.

(21) Appl. No.: 14/428,347

(22) PCT Filed: Sep. 10, 2013

(86) PCT No.: PCT/GB2013/000379
§ 371 (c)(1),
(2) Date: Mar. 13, 2015

(87) PCT Pub. No.: WO2014/041323
PCT Pub. Date: Mar. 20, 2014

(65) Prior Publication Data
US 2015/0234094 A1 Aug. 20, 2015

(30) Foreign Application Priority Data

Sep. 14, 2012 (GB) .................................. 1216444.8
May 3, 2013 (GB) .................................. 1308001.5

(51) Int. Cl.
G02B 1/04 (2006.01)
C08G 18/40 (2006.01)
C08G 18/73 (2006.01)
C08G 18/75 (2006.01)

(52) U.S. Cl.
CPC ........... *G02B 1/043* (2013.01); *C08G 18/4009* (2013.01); *C08G 18/73* (2013.01); *C08G 18/758* (2013.01); *C08G 2210/00* (2013.01); *G02B 2207/109* (2013.01)

(58) Field of Classification Search
None
See application file for complete search history.

(56) References Cited

U.S. PATENT DOCUMENTS

| 4,136,250 A | 1/1979 | Mueller et al. |
| 4,711,943 A | 12/1987 | Harvey, III |
| 4,962,178 A | 10/1990 | Harisiades |
| 4,983,702 A | 1/1991 | Mueller et al. |
| 6,312,706 B1 | 11/2001 | Lai et al. |
| 2012/0302656 A1* | 11/2012 | Rashid ............... C08G 18/4833 521/170 |
| 2012/0302661 A1* | 11/2012 | Rashid ............... C08G 18/4833 523/107 |
| 2012/0316256 A1* | 12/2012 | Rashid ............... C08G 18/4825 521/170 |
| 2013/0053511 A1* | 2/2013 | Rashid ............... C08G 18/4829 524/588 |
| 2015/0234094 A1* | 8/2015 | Rashid ................... G02B 1/043 523/107 |

FOREIGN PATENT DOCUMENTS

| GB | WO 2011055108 A1 * | 5/2011 | ......... C08G 18/4833 |
| WO | 2011055108 A1 | 5/2011 | |

* cited by examiner

Primary Examiner — Peter A Salamon
(74) Attorney, Agent, or Firm — Foley & Lardner LLP

(57) ABSTRACT

There is provided a polyurethane xerogel prepared from a mixture comprising: (a) at least one isocyanate, (b) at least one silicone containing compound of formula J: wherein at least one group represents a hydrocarbyl group and p represents an integer of from 1 to 40, or at least one $R_2$ group represents a hydrocarbyl group and q represents an integer of from 1 to 40; and at least one $R_3$ group represents a hydrocarbyl group and w represents an integer of from 1 to 40, or at least one $R_4$ group represents a hydrocarbyl group and y represents an integer of from 1 to 40; (c) optionally one or more additional components; wherein the isocyanate and silicone containing compound are reacted under substantially anhydrous conditions. There is also provided a contact lens formed from the polyurethane xerogel.

Formula J

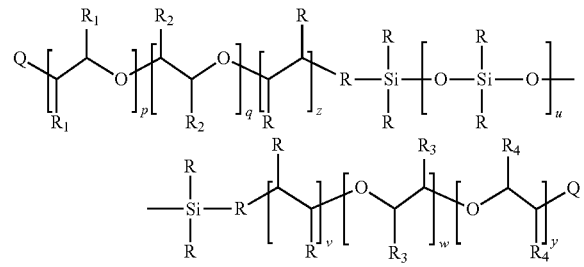

17 Claims, No Drawings

POLYMERS FOR CONTACT LENSES

REFERENCE TO RELATED APPLICATIONS

This application is the U.S. National Phase Entry of International Patent Application No. PCT/GB2013/000379 filed Sep. 10, 2013, which claims priority to GB Patent Application No. 1216444.8 filed Sep. 14, 2012 and GB Patent Application No. 1308001.5 filed May 3, 2013.

The present invention relates to thermoplastic polyurethane-based polymers that have applications in the field of contact lens technology. In particular, the present invention relates to silicone-containing polyurethane-based polymers. The invention also relates to a process for preparing such materials.

BACKGROUND TO THE INVENTION

Soft contact lenses offer a viable alternative to spectacles for the correction of visual defects such as myopia, hypermetropia and astigmatism. Since the pioneering work of Wichterle and Lim, hydrogel soft contact lenses have become a viable alternative to spectacles for the refractive correction of myopia, hyperopia and astigmatism. Hydrogel polymers, which make up the majority of lenses sold worldwide, are based on copolymers of 2 hydroxy ethyl methacrylate (HEMA). Although these lenses provide some comfort, they do not provide sufficient oxygen permeability to prevent problems associated with corneal hypoxia. Attempts to address this problem included copolymerising HEMA with hydrophilic monomers such as methacrylic acid acrylamide, poly (vinyl alcohols) and n vinyl lactams such as N-vinyl pyrrolidone. Although these polymers increased the level of oxygen permeability, the incorporation of these comonomers also leads to problems such as protein and lipid deposition, corneal desiccation, staining and lens dehydration.

More recently, a new generation of polymers has been developed to further increase the level of oxygen. These materials are based on the copolymerisation of silicone methacrylate with hydrophilic comonomers. Although successful in further increasing the oxygen permeability, these new materials still suffer from limitations such as lipid binding and dryness, all of which decrease lens on eye comfort.

The use of silicone-containing polymers has led to contact lenses exhibiting much higher oxygen permeabilities. However, the incorporation of silicone can lead to other adverse performance characteristics, such as surface wettability and opacity problems.

Silicone-containing materials suitable for contact lens technology are described in U.S. Pat. No. 6,312,706, which discloses a hydrogel material that is the polymerisation product of a comonomer mixture comprising (a) a polysiloxane-containing urethane prepolymer end-capped with polymerizable ethylenically unsaturated organic radicals, (b) tris-(trimethylsiloxy)silyl propyl methacrylate and (c) a hydrophilic comonomer.

U.S. Pat. No. 4,136,250 teaches polymers formed from mono-olefinic monomers cross-linked with a major amount of a di- or tri-olefinic polysiloxane based macromer having a molecular weight between about 400 and about 800.

U.S. Pat. No. 4,962,178 discloses siloxane-urethane polymers suitable for use as oxygen permeable membranes or ophthalmic devices, having based on total urethane groups 50-80% of —C—NH—COO—C— groups and 50-20% of —C—NH—COO—Si— groups, which consists essentially of the polymerisation product of (a) 80-95% weight of a poly-isocyanate capped, linear or branched polysiloxane prepolymer and (b) 20-50% by weight of a linear polydialkyl or polydiphenyl-siloxane disilanol having terminal siloxanol groups.

U.S. Pat. No. 4,983,702 discloses a cross-linked siloxane-urethane polymer in the form of an ophthalmic device, which consists essentially of the reaction product of (a) a di- or poly-hydroxyalkyl substituted alkyl polysiloxane and (b) an aliphatic, cycloaliphatic or atomatic di- or tri-isocyanate, wherein the total number of hydroxyl groups in component (a) is stoichiometrically equivalent to the total number of isocyanate groups in component (b), and with the proviso that an effective cross-linking amount of (a) or (b) is present and possesses a functionality of greater than two.

U.S. Pat. No. 4,711,943 discloses a non-fibrous polymeric contact lens material having improved oxygen permeability and stability, said material comprising a monomer having a first portion for increasing wettability which is hydrophilic and includes a side chain functionality selected from —CO—N— or —O—CO—N— (such as an acrylamide), and a second portion for increasing oxygen permeability, said second portion including a siloxane.

One class of polymers which holds considerable promise for novel contact lens materials are PEG based polyurethanes, and the use of silicone-containing PEG based polyurethanes in the manufacture of contact lenses is known. In particular, WO2011/055108 discloses the use of silicone containing compounds in the preparation of polyurethane polymers useful in the manufacture of contact lenses. The use of silicone containing compounds to increase the oxygen permeability of the resultant polyurethane polymers is disclosed. However, it has been found that if too much silicone-containing compound is used in the manufacture of the polyurethane polymer, the polymer becomes opaque or semi-opaque, rendering the polymer unsuitable in the field of contact lenses.

The present invention seeks to provide new silicone-containing polyurethane-based materials that are suitable for use in the contact lens industry. The silicone-containing polyurethane-based materials of the invention are thermoplastic copolymers that exhibit exemplary physical properties, in particular in terms of oxygen permeability and light transmissibility. Advantageously, the thermoplastic materials described herein are suitable for use in conventional injection moulding apparatus, thereby enabling high throughput production of contact lenses.

Problems

Currently contact lenses are made by cast moulding thermoset resins (primarily acrylic based). This is a costly, time consuming, multistep process. It is thus desirable to generate a thermoplastic hydrogel material which can be thermally processed into a contact lens having physical properties similar to (preferably better than) cast moulded lenses.

It has long been acknowledged that contact lenses having a high associated oxygen permeability, or DK, limit corneal hypoxia which is important to the health of the eye. Thus it is a desirable attribute to have a lens material with a high DK, ideally above 50 Barrer.

Ethylene glycol based acrylic polymer hydrogels reported in the literature are known to have low DK. The DK of these materials are dependent upon the diffusion of oxygen through the water phase of the gel. Increasing the DK above 40 is often achieved by increasing the water content. However this is known to have a negative effect on the gel properties, such as modulus and strength, making them unsuitable for use in the manufacture of contact lenses. To overcome this issue, silicone based compounds have been incorporated into these polymers.

However, it is known that incorporating hydrophobic silicone units into hydrophilic polymers, such as PEG based polyurethane polymers, results in materials which phase separate, forming macrodomains, resulting in materials with poor transparency. The resultant materials are therefore unsuitable for use in the manufacture of contact lenses.

It is also difficult to form contact lenses having good clarity from such PEG based silicone-containing materials.

Known silicone containing polyurethane materials have been found to exhibit a high processing temperature, the melted composition proving very viscous unless subjected to high processing temperatures. This increases the cost and complexity of processing.

Known silicone containing polyurethane materials have been found to have poor wettability, meaning that medical devices formed from such materials are associated with increased wearer discomfort and an increased risk of infection, in particular following extended periods of wear.

The molding of a polymeric composition introduces stresses, in particular where the polymeric composition is moulded through injection molding processes. In particular, stress cracking often appears upon hydration of known PEG based polyurethane polymers. The structural stability of articles of manufacture formed from known PEG based polyurethane polymers can be low, in particular where the polyurethane polymers are formed from silicone containing compounds.

Current contact lenses formed from known silicone containing polyurethane materials are often associated with low biocompatibility. Such lenses trigger a foreign body response where biomolecules such as protein, lipids, immunoglobulins and complement proteins bind at the surface of the lens. This reduces tear film stability which is not desirable, as it is associated with causing the eye to feel dry, and for the contact lenses to feel uncomfortable after prolonged periods of wear. The more hydrophobic the surface of a contact lens, the greater the likelihood of the tear component being adsorbed and hence the higher the chances of dry spot formation. This also increases discomfort and the risk of infection. In addition, the higher the contact angle and the higher the frictional properties associated with the surface of a contact lens, the less comfortable the lens and the greater the risk of associated eye infection.

Surprisingly, through appropriate selection of reactants we can generate clear materials having high transparency and high associated DK despite the incorporation of high levels of silicone.

STATEMENT OF INVENTION

A first aspect of the invention relates to a polyurethane xerogel prepared from a mixture comprising:
(a) at least one isocyanate, generally a di-isocyanate (which may be in the form of a blocked di-isocyanate);
(b) at least one silicone containing compound of formula J

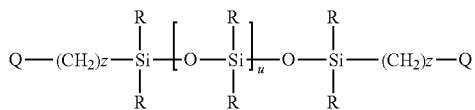

where each R, $R_1$, $R_2$, $R_3$ and $R_4$ independently represents a hydrocarbyl group (generally a small alkyl group) or H;
p is an integer from 0 to 40, suitably 1 to 10;
q is an integer from 0 to 40, suitably 1 to 10;
z is an integer from 1 to 50, generally 1 to 10, suitably 1 to 3;
u is an integer from 1 to 100, suitably 10-40 to 20 even more suitably 1-10;
each Q group independently represents a COOH, OH, SH, $NH_2$, NHR or NCO group, typically each Q represents OH; and
wherein at least one $R_1$ group represents a hydrocarbyl group and p represents an integer of from 1 to 40, or at least one $R_2$ group represents a hydrocarbyl group and q represents an integer of from 1 to 40; and
at least one $R_3$ group represents a hydrocarbyl group and w represents an integer of from 1 to 40, or at least one $R_4$ group represents a hydrocarbyl group and y represents an integer of from 1 to 40;
wherein the isocyanate and silicone containing compound are reacted under substantially anhydrous conditions.

The silicone containing compound of formula J includes some branching due to at least two of $R_1$, $R_2$, $R_3$ and $R_4$ representing a hydrocarbyl group. Whilst the applicants do not wish to be bound by theory, it is believed that this branching reduces the intermolecular interaction between polymer chains, reducing the occurrence and size of aggregations (domains) between hard segments of the polymer chains, and thus reducing phase separation in the resultant polymer. Accordingly the incorporation of a branched silicone containing compound improves the transparency of articles of manufacture formed from the resultant polymer.

Generally, the use of branched silicone containing compounds would be avoided as these are associated with a reduction in tensile properties of the resultant polymer due to the reduced intermolecular interaction between polymer chains. However, surprisingly from careful selection of the reactants, the polymers of the present invention have properties making them suitable for the manufacture of medical devices including ophthalmic devices, such as contact lenses.

Generally, at least two of $R_1$, $R_2$, $R_3$ and $R_4$ represent a hydrocarbyl group, particularly a small alkyl group such as methyl. In such embodiments, the silicone containing compound includes at least two functional reactive groups.

Alternatively, the reactant mixture may comprise a silicone containing compound of Formula J where both p and q represent 0. In such embodiments, the silicone containing compound does not comprise a PEG portion and the reactant mixture generally includes a separate PEG compound.

According to such embodiments, there is provided a polyurethane xerogel prepared from a mixture comprising:
(a) at least one isocyanate, generally a di-isocyanate (which may be in the form of a blocked di-isocyanate);
(b) at least one silicone containing compound of formula C:

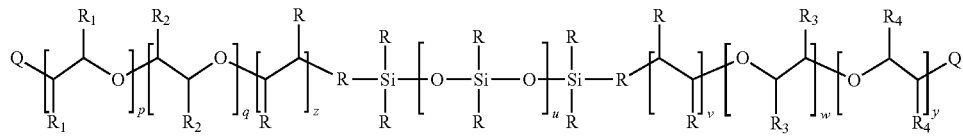

where each R group independently represents a hydrocarbyl group (generally a small alkyl group) or H;
z is an integer from 1 to 50, generally 1 to 10, suitably 1 to 3;
u is an integer from 1 to 100, suitably 10-40 to 20 even more suitably 1-10;
each Q group independently represents a COOH, OH, SH, NH$_2$, NHR or NCO group, typically each Q represents OH; and
(c) generally a PEG compound;
wherein the isocyanate, silicone containing compound and typically the PEG compound are reacted under substantially anhydrous conditions.

Generally the silicone containing compound comprises a PEG portion (typically the PEG portion being 10 wt % or more of the silicone containing compound) and/or said mixture comprises a PEG compound.

Generally the silicone containing compound comprises at least one ethylene oxide unit and at least one propylene oxide unit.

According to a further aspect of the invention, there is provided a polyurethane xerogel comprising a compound of Formula I, and/or prepared from a mixture comprising a silicone containing compound of Formula I:

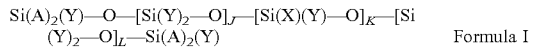
Formula I where each A group independently represents an optionally substituted hydrocarbyl group, typically a small, optionally substituted alkyl, aryl or alkoxy group, generally a small alkyl group (i.e. methyl, ethyl, propyl, butyl etc.);
X represents an ether containing hydrocarbyl group,
Each Y group independently represents an X group (as defined above), or an A group (as defined above),
J represents an integer from 0 to 100, generally 0 to 50,
K represents an integer from 1 to 100, generally 1 to 50,
L represents an integer from 0 to 100, generally 0 to 50.

The silicone containing compound may be added prior to and/or after curing of the polyurethane xerogel.

Silicone containing compounds of Formula I may act as a plasticiser to reduce the modulus of the resultant composition, provide ease in processing and/or modify the surface of articles formed from the resultant composition to reduce the associated wetting angle.

Surprisingly, the incorporation of the silicone-containing compounds of Formula I before curing of the polyurethane xerogel reduces the processing temperature of the resultant composition and makes it easier for RCM process. The viscosity of the composition is reduced to an appropriate level to allow processing at a lower temperature. This reduction in processing temperature reduces the cost and complexity of processing, for instance through reaction cast moulding or injection moulding techniques. When processed using injection moulding techniques, the silicone containing compound can also be blended with the thermoplastic material afforded post polymerisation (curing).

Generally the polyurethane composition of the present invention has an associated processing temperature of 130-200° C. The addition of compounds of Formula I generally reduces the viscosity of the reactant mixture, resulting in a material which can be more easily processed.

In addition, the incorporation of the silicone-containing compounds of Formula I act to alter the properties of the surface of the resultant polymeric composition. In particular, the incorporation reduces the contact angle associated with the resultant polymeric composition, increasing biocompatibility and comfort on or in a human or animal body. A reduced contact angle is also associated with a decreased risk of infection. The risk and magnitude of any foreign body response will be greatly decreased. The incorporation of the silicone-containing compounds of Formula I increases the hydrophilicity of the surface of the resultant polymers, and decreases their associated frictional properties. Where the polymer material is in the form of a contact lens, a reduced contact angle is associated with better tear film stability resulting in greater comfort for the user.

Typically the contact angle of the polyurethane polymer of the present invention is 30 to 700, generally 30 to 50°.

Generally the polyurethane xerogel is prepared from a mixture comprising:
(a) at least one polyethylene glycol;
(b) at least one isocyanate, which may be in the form of a blocked isocyanate;
(c) at least one silicone containing monomer, typically comprising a PEG portion (generally of Formula J above);
(d) at least one silicone containing compound of formula I,
(d) optionally a polyfunctional compound having an average functionality greater than 2, comprising COOH, OH, SH, NH$_2$, NHR and/or NCO functional groups where R represents an alkyl group,
(e) optionally a chain extender,
wherein the polyethylene glycol, isocyanate, silicone containing compound and optionally the polyfunctional compound and/or chain extender are reacted under substantially anhydrous conditions to complete the reaction,
wherein the silicone containing compound of Formula I may be added prior to curing, and/or after curing (generally prior to curing).

According to one embodiment, the polyurethane xerogel is thermoplastic and is suitable for processing using conventional thermoplastic techniques (i.e. injection moulding, extrusion, compression moulding etc.).

According to one embodiment, the polyurethane composition is also suitable for reaction cast moulding techniques.

Generally, at least 95 wt % of the reactants in the mixture have an average functionality of 2 or less; typically at least 99 wt % of the reactants in the mixture; suitably at least 99.5 wt % of the reactants in the mixture; more suitably substantially 100 wt % of the reactants in the mixture have an average functionality of 2 or less.

According to one embodiment, the mixture used to form the polyurethane xerogel of the present invention includes a chain extender comprising one or more of COOH, OH, SH, and NH$_2$ terminal groups, generally at least one diol, in particular at least one diol of formula D,

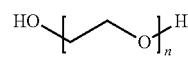

wherein n is an integer from 1 to 25, suitably 1 to 10, more suitably 1 to 4;

There is a long felt want in the contact lens industry for materials having a high oxygen permeability. Materials having a DK of more than 60 Barrer would be suitable, suitably 80 Barrer or more, more suitably 100 Barrer or more, advantageously 120 Barrer or more. In general, the more silicone-containing compound which is used in the manufacture of the polyurethane polymer, the higher the DK. However, if too much silicone containing composition is used in the manufacture of the polyurethane polymer opacity in the resultant polymer may result & increase with concentration, rendering the polymer unsuitable for use in the manufacture of contact lenses. The addition of a silicone containing component in the manufacture of a polyurethane polymer is also associated with surface wettability problems. The amount of silicone-containing component which may be added before it renders the resultant polymer opaque or semi-opaque depends on the silicone containing compound used.

Generally it is difficult to incorporate silicone containing monomers into PEG based polymers without adversely affecting the transparency of the resulting polymer because silicone containing monomers are relatively hydrophobic and PEG is hydrophilic. This mismatch causes opacity in the system. However modified silicone macromers (e.g., DBE C25) can be incorporated into PEG based polymers. But the weight fraction of such modified materials is generally less than ~6% that results a transparent composition (see comparative examples in Tables 2 and 3). At these levels of Silicone (PDMS), the polymer compositions do not generally afford a high level of oxygen transmission (DK>50 or more) required by the contact lens industry.

Surprisingly it has been found that a silicone content of around 25-35 wt % or more of PDMS is required to generate PEG based polymers that would afford a DK of around 50 Barrer or more.

Surprisingly it has also been found that the compositions of the present invention may include more than 35 wt % silicone whilst maintaining good transparency properties.

Typically the polymers of the present invention have an associated DK of more than 70 Barrer, typically more than 100 Barrer or more.

A second aspect of the invention relates to a polyurethane hydrogel which comprises the polyurethane xerogel as described above in hydrated form.

A third aspect of the invention relates to a process for preparing a polyurethane xerogel, said process comprising:
(i) preparing the reactant mixture as described above; and
(ii) reacting the mixture formed in step (i) using substantially anhydrous materials to form a polyurethane xerogel.

A fourth aspect of the invention relates to a polyurethane xerogel obtainable by the above process.

A fifth aspect of the invention relates to a process for preparing a polyurethane hydrogel, said process comprising preparing a polyurethane xerogel as described above, and hydrating said polyurethane xerogel with an aqueous medium to form a polyurethane hydrogel.

A sixth aspect of the invention relates to a polyurethane hydrogel obtainable by the process described above.

A seventh aspect of the invention relates to a process for preparing a polyurethane xerogel in the form of a moulded article, said process comprising the steps of:
(i) preparing a reaction mixture as described above;
(ii) reacting the reaction mixture formed in step (i) under substantially anhydrous conditions to form a polyurethane xerogel; and
(iii) processing the polyurethane xerogel to form a moulded article.

Generally the step of processing the polyurethane xerogel involves injection moulding the polyurethane xerogel.

An eighth aspect of the invention relates to a process for preparing a polyurethane hydrogel in the form of a moulded article, said process comprising preparing a polyurethane xerogel in the form of a moulded article as described above, and hydrating said moulded article with an aqueous medium to form a polyurethane hydrogel.

A ninth aspect of the invention relates to an article of manufacture comprising a polyurethane xerogel or a polyurethane hydrogel as described above.

A tenth aspect of the invention relates to the use of a polyurethane xerogel or a polyurethane hydrogel as described above in the preparation of an ophthalmic device such as a contact lens.

DETAILED DESCRIPTION

Definitions

The functionality of a compound is used to refer to the number of functional groups that are capable of reacting in the reaction mixture. As such a "diol" refers to a compound comprising two hydroxyl functional groups capable of reacting in the reaction mixture and a "diisocyanate" refers to a compound comprising two NCO functional groups capable of reacting in the reaction mixture.

"DK" is a measure of the oxygen permeability of a material provided in Barrer units where 1 Barrer=$10^{-11}$ $cm^2 \cdot mL \cdot mmHg$.

The term "hydrogel" is used herein to refer to a polymer comprising 10 wt % or more water. Generally, a hydrogel in an aqueous medium will absorb water and retain its original dry shape but it will be enlarged. It will not dissolve in water to form a fluid unless it is significantly degraded.

The term "xerogel" is used to refer to a polymeric material which may form a hydrogel upon contact with sufficient water. Generally a xerogel is dry and comprises less than 5 wt. % water.

The terms "substantially anhydrous" and/or "dehydrated" are used herein to refer to conditions in which the amount of water is sufficiently low so as to produce a polyurethane backbone that is substantially free from urea groups. Suitably the amount of water in the reactant mixture is less than about 0.3 wt. %, more suitably less than about 0.1 wt. %, even more suitably less than about 0.05 wt. %.

The term "carbinol" is used to refer to a hydroxyl functional group attached to a carbon atom. The carbon atom may be attached to a carbon atom (in particular a carbon atom forming part of a hydrocarbon group), a non-carbon atom including Si, N and O.

The term "small alkyl group" refers to an alkyl group having a carbon backbone of 1 to 6 carbon atoms, typically 1 to 4 carbon atoms.

The term "monomer" used herein refers to low molecular weight compounds (i.e. typically having number average molecular weights less than 700) that can be polymerized, and to medium to high molecular weight compounds or polymers, sometimes referred to as macromonomers, (i.e. typically having number average molecular weights greater than 700) containing functional groups capable of further polymerization. Thus, it is understood that the terms "silicone-containing monomers" include monomers, macromonomers and prepolymers. Prepolymers are partially polymerized monomers or monomers which are capable of further polymerization.

A "silicone-containing" compound or monomer is one that contains at least two [—Si—O—] repeating units, in a monomer, macromer or prepolymer. Preferably, the total Si and attached O are present in the silicone-containing monomer in an amount greater than weight percent, and more preferably greater than 30 weight percent of the total molecular weight of the silicone-containing monomer.

The term "small alkyl group" refers to an alkyl group having a carbon backbone of 1 to 6 carbon atoms, typically 1 to 4 carbon atoms.

The term "partial cross-linking" is used to refer to compositions which are thermoplastic but which include crosslinking between some polymer chains and/or branching between some polymer chains. Generally cross-linking is covalent, but there may also be some degree of polymer chain entanglement. Generally, a partially cross-linked material comprises some covalent cross-linking. Typically, less than 20% of the polymer chains in a partially cross-linked composition are covalently cross-linked.

The term "thermoplastic" is used to refer to a composition which melts at a temperature lower than the temperature at which it degrades.

The term "thermoset" is used to refer to a composition which melts at a temperature higher than the temperature at which it degrades.

The term "reaction cast moulding" (RCM) is used to refer to moulding techniques which involve the steps of mixing the reactants together, dispensing the reactant mixture into a mould and allowing the reactant mixture to react and cure (generally with the assistance with energy, in particular thermal energy or radiation).

The term "injection moulding" (IM) is used to refer to moulding techniques which involve the steps of mixing the reactants together and allowing a polymerisation reaction to complete prior to dispensing into a mould cavity to form an article. The thermoplastic composition is generally injected through a flow or fluid channel into a moulding cavity.

The term "blocked" compound is used to refer to a compound having one or more functional groups which are unable to react in the reactant mixture before being activated, where activation generally occurs through the exposure of the blocked compound to known thermal and/or chemical conditions. The activation is predictable and reliable. Generally the functional groups are blocked by being chemically bonded to a blocking compound. The blocking compound is generally unreactive in the reactant mixture under the reaction conditions used to form the polymer of the invention. The blocking compound is reliably and predictably removable under pre-determined conditions, typically thermal and/or chemical conditions. Where the blocked functional group is an isocyanate group, the blocking compound may comprise a 3,5-dimethylpyrazole group (DMP). The blocked compound may be activated prior to the formation of the reactant mixture, during the mixing of the reactant mixture or after mixing has taken place.

"Physical interactions" or "physical forces" are used to refer to non-covalent interactions including polymer chain entanglement and hydrogen bonding.

Polymeric Material

It has long been acknowledged that contact lenses having a high associated oxygen permeability or DK have good on eye comfort. However, it has been found that increasing the DK over approximately 40 Barrer adversely affects the transparency of items formed from the polyurethane material rendering the materials unsuitable for use in the manufacture of contact lenses. Surprisingly it has now been found that by using a specific class of silicone-containing materials, polymers having a far higher DK can be formed, said polymers having good associated transparency.

In general, items formed from known polyurethane materials having a silicone content of over 6 wt % are opaque or semi-opaque. Typically items formed from known polyurethane materials having an associated DK of over 40 Barrer are opaque or semi-opaque.

Surprisingly, the polyurethane material of the present invention has an associated DK of over 80 Barrer; typically over 100 Barrer or more, suitably more than 120 or more Barrer whilst maintaining good transparency. Generally the polymer of the present invention has a silicone content of over 6 wt %, typically over 25 wt % or more, suitably around 40 wt % or more.

In such embodiments, the reactant mixture may include one or more silicone containing compounds of formula I wherein some or all terminal groups generally do not react under the polymerisation conditions. Generally all of the terminal groups do not react under the polymerisation conditions. Suitably some or all of the terminal groups are acetoxy capped. According to one embodiment, the reactant mixture comprises one or more silicone containing compounds having the structure:

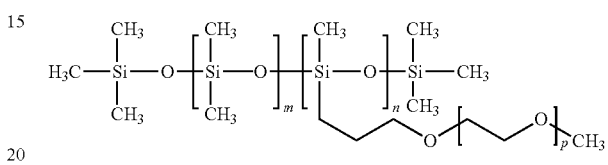

Alternatively, the polymeric composition of the present invention may have a lower silicone concentration of 0.2 to 5 wt %, typically 0.2 to 2 wt %, suitably 0.3 to 1 wt %. Suitably, the polymeric materials of the invention are thermoplastic, i.e. the polymer softens and can flow when exposed to heat and pressure. The thermoplastic polymers described herein are ideal for use in the contact lens industry as they enable the cost effective manufacture of lenses on a large scale compared to processes which rely on reaction cast moulding.

Moreover, the absence of water (as far as practically attainable) minimises the formation of urea groups in the polymer backbone, thereby giving rise to materials having lower, more desirable modulus values favoured by the contact lens industry.

The resulting PDMS containing polymers therefore exhibit high thermal stability and resistance to oxidative degradation. Suitably, the compositions are water insoluble but swellable in the presence of aqueous media.

Suitably, the polyurethane xerogel of the invention is in the form of a contact lens.

The silicone containing compounds of Formula I comprise at least one ether containing hydrocarbyl group. According to one embodiment, this may be terminated with a functional group capable of taking part in the polymerisation reaction used to cure the polyurethane xerogel. Suitable functional groups include COOH, OH, SH, $NH_2$, NHR and/or NCO functional groups (where R represents an alkyl group). According to one embodiment, the ether containing hydrocarbyl group is hydroxyl terminated, suitably carbinol terminated.

According to one embodiment, the reactant mixture used to form the polyurethane xerogel comprises at least one silicone containing compounds of Formula I.

According to one embodiment, the silicone containing compounds of Formula I do not contain any functional group capable of taking part in the polymerisation reaction used to form the polyurethane xerogel. Any functional group may suitably be capped, for instance with an alkyl group to prevent reaction in the polymerisation reaction.

The silicone containing compound may be added prior to and/or after curing of the polyurethane xerogel.

Where the silicone containing compound is added prior to curing, the melting temperature, and thus the processing temperature is suitably reduced. The cost and complexity of a moulding process is reduced accordingly.

For thermoset compositions moulded according to RCM methods, it is advantageous for the reactant mixture to be dispensed into the mould at or around ambient temperature, and the incorporation of a silicone containing compound of Formula I may reduce the melting point of the reactant mixture, thus reducing the temperature at which the reactant mixture is dispensed into the mould. Advantageously in one embodiment, the reactant mixture may be dispensed into the mold from around 20 to around 40° C. where it incorporates at least one silicone containing compound of Formula I.

Where added after formation of the polyurethane composition, the silicone containing compound of Formula I may comprise any functional group(s). If the functional groups are hydrophilic these will impart beneficial attributes to the polyurethane compositions such as lowering the wetting angle, the compound of Formula I may comprise one or more COOH, OH, SH, $NH_2$, and OR functional groups (where R represents an alkyl group).

Where the polyurethane composition is to be injection moulded, at least one compound of Formula I may be compounded with the polyurethane composition prior to moulding thereof.

Where the silicone containing compound is added after formation of the polyurethane composition, the hydrophilicity of the surfaces of the resultant composition and articles formed there from is generally increased, thus increasing their biocompatibility. In addition, the contact angle of the surface of articles formed from the resultant composition is generally reduced. Body fluids (such as blood, urine, tears and sweat) are tolerated more easily by surfaces having a low contact angle. Aqueous films can form more easily, and once formed are maintained more easily on such surfaces. The resultant polyurethane composition is thus particularly suited to applications requiring compatibility in or on the human or animal body as a higher hydrophilicity and/or a low contact angle would increase comfort. Such use is also expected to afford high comfort levels and low risk of infection. In particular it is anticipated that the material of the present invention is likely to afford a contact lens with high tear film stability and hence a better comfort will be experienced by the wearer. According to one embodiment, the materials of the present invention have an associated contact angle of 60° or less, typically 50° or less, suitably around 40°.

Siloxane based hydrogels have high contact angle—~80-90 degrees. The incorporation of one or more silicone containing compounds of Formula I generally reduces the contact angle below 70 degrees, ideally lower than 60 degrees.

The polymeric composition of the present invention is generally used to form a moulded article, and the moulding of the polymeric composition introduces stresses. The stresses introduced are particularly marked where the article is molded through injection molding processes. In particular, stress cracking often appears upon hydration of known PEG based polyurethane polymers. The incorporation of one or more compounds of Formula I into thermoplastic polymers, appears to greatly reduce or eliminate the stresses introduced through the molding cycle. The stresses are dissipated. This greatly increases the structural integrity of molded articles formed from the polymeric material of the present invention. In particular, the shape of the molded articles generally doesn't change upon storage, and stress cracks are not formed upon hydration of the molded article.

The articles of manufacture of the present invention are generally dimensionally and structurally stable upon hydration and/or storage.

In particular, the dimensions of the moulded articles of the present invention generally alter by less than 2%; typically by less than 1.0%; suitably by less than 0.5% following hydration and/or storage for 1 month or more.

The chemical structure of the polymer material from which the moulded article is formed does not alter or degrade to any appreciable degree following hydration and/or storage.

Where the reactant mixture comprises one or more silicone containing compounds of Formula I, the reactant mixture generally comprises 2 to 30 wt % silicone containing compounds of Formula I, typically 5 to 25 wt %, suitably 5 to 20 wt % silicone containing compounds of Formula I.

Where the reactant mixture does not comprise the silicone containing compounds of Formula I, the polyurethane xerogel is mixed with silicone containing compounds of Formula I after it has been cured. Generally a mixture of polyurethane xerogel and silicone containing compounds of Formula I is formed. The mixture may comprise 2 to 30 wt % silicone containing compounds of Formula I, typically 5 to 25 wt %, suitably 5 to 20 wt % silicone containing compounds of Formula I (where the remainder of the mixture is polyurethane xerogel). The formula1 compound is devoid of any reactive functional group when it is added to the reactants prior to the polymerisation, however when it is added post polymerisation then the formula I compound may have one or more functional groups which would be reactive under the polymerisation conditions used to form the polyurethane composition because at this stage the polymerisation step has already taken place. The functional/hydrophilic group can provide beneficial effects to the resulting polyurethane composition and/or articles made from it.

According to one embodiment, the reactant mixture comprises silicone containing compounds of Formula I and other reactive components that after reaction form polyurethane composition. In addition, one or more compounds of formula I may be added to the composition after formation thereof. For such embodiments, the reactant mixture generally comprises 2 to 30 wt % silicone containing compounds of Formula I, typically 5 to 25 wt %, suitably 5 to 20 wt %; more suitably 15 to 20 wt % silicone containing compounds of Formula I.

According to one embodiment the resultant composition has a relatively high silicone content, generally 30 to 4 wt %. In such embodiments, the reactant mixture may comprise 50 to 70 wt % of at least one silicone containing monomer of Formula J.

According to one embodiment the resultant composition has a relatively low silicone content, generally 0.2 to 1 wt %. In such embodiments, the reactant mixture may comprise 0.5 to 2 wt % of at least one silicone containing monomer of Formula J.

The embodiments where Formula I compound is added after curing, the mixture of polyurethane xerogel and silicone containing compounds of Formula I may comprise 2 to 30 wt % silicone containing compounds of Formula I, typically 1 to 10 wt % silicone containing compounds of Formula I (while the remainder of the mixture is polyurethane xerogel).

The addition of the silicone containing compounds of Formula I both before and after curing of the polyurethane xerogel provides surprisingly low contact angles in the resultant polymer.

Isocyanate

The polyurethane xerogel of the present invention is prepared from a reactant mixture comprising at least one isocyanate, suitably comprising at least 25 wt % of at least one isocyanate. Generally the isocyanate is a di-isocyanate such as an organic di-isocyanate.

According to one embodiment, the reactant mixture comprises 25 to 40 wt % isocyanate; generally 25 to 35 wt % isocyanate; typically 27 to 32 wt %.

The isocyanate compound may comprise one or more blocked isocyanate groups.

The isocyanate performs a number of different functions. Firstly, it acts as a coupling agent for the poly(ethylene glycol) or polyol component to produce the soft segment. Secondly, it acts as a coupling agent to produce urethane-rich hard segments. Thirdly, it acts as a coupling agent for the soft and hard segments to build up the molecular weight of the resulting polymer.

The isocyanate is generally a di-isocyanate, typically an organic di-isocyanate, suitably an aliphatic di-isocyanate. Aliphatic di-isocyanates which are fluid at ambient temperatures are particularly suitable.

Suitably, the di-isocyanate is of the formula OCN—R1-NCO, wherein R1 is a linear or branched C3-C18-alkylene, an unsubstituted or C1-C4-alkyl-substituted or C1-C4-alkoxy-substituted C6-C10-arylene, a C7-C18-aralkylene, a C6-C10-arylene-C1-C2-alkylene-C6-C10-arylene, a C3-C8-cycloalkylene, a C3-C8-cycloalkylene-C1-C6-alkylene, a C3-C8-cycloalkylene-C1-C6-alkylene-C3-C8-cycloalkylene or a C1-C6-alkylene-C3-C8-cyclo-alkylene-C1-C6-alkylene.

Examples of typical diisocyanates include hexane diisocyanate, methylene dicyclohexyl diisocyanate, hexamethylene diisocyanate, isophorone diisocyanate, toluene-2,4-diisocyanate, toluene-2,6-diisocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 4,4"-biphenylene diisocyanate, 3,3"-dichloro4,4"-biphenylene diisocyanate, 1,6-hexamethylene diisocyanate, 1,4-tetramethylene diisocyanate, 1,10-decamethylene diisocyanate, cumene-2,4-diisocyanate, 1,5-napthalene diisocyanate, 1,4-cyclohexylene diisocyanate, 2,5-fluorenediisocyanate, polymeric 4,4'-diphenylmethane diisocyanate.

According to one embodiment, the di-isocyanate is Desmodur W (methylene bis(4-cyclohexyl isocyanate), MW=262.5).

According to a further embodiment, the di-isocyanate is hexamethylene diisocyanate.

Suitably, the di-isocyanate is used in an amount of from about 0.05 to about 55, more suitably from about 10 to about 40, more suitably, from about 10 to about 20, generally from about 10 to about 17 wt % of the reactants. The amount of di-isocyanate in any given composition can be adjusted to modify the relevant contact lens properties/attributes.

According to one embodiment the isocyanate may be partially or completely blocked and can suitably be activated during polymerisation by the use of heat.

Typically, the, or each blocked isocyanate group may be activated through chemical or thermal stimuli, typically through thermal activation.

Some or all of the isocyanate groups may be activated during mixing of the reactants to form the mixture used to prepare the polymer of the invention.

Suitable blocked isocyanate compounds are sold by Bexendex under the trade name Triexene (see for instance, Triexene B1795 and B 17960.

According to one embodiment the isocyanate may be partially or completely blocked. The monomer may be activated during polymerisation by the use heat (i.e. as illustrated by Bexendex's range of thermally reversible blocked isocyanate—Triexene B1795, B17960) to generate a reactive isocyanate.

The stoichiometry (OH/NCO ratio) of the reacting mixture plays an important part in determining the properties of the resultant polymer, for example, the molecular weight/ modulus of the material, is expected to be relatively higher for a 1:1 NCO:OH stoichiometry, and such a material is also expected to afford relatively lower water content on hydration than the polymer afforded by a composition that has a non stoichiometric ratio (e.g. OH groups>NCO groups). The skilled person would thus appreciate that the NCO:OH stoichiometry can be adjusted so as to obtain a material with the desired modulus and to some degree water content. Suitably the stoichiometry can also be used to enhance the thermal stability and storage stability.

In one particularly preferred embodiment, the polyethylene glycol, the chain extender and the di-isocyanates are employed in such proportions as to provide an overall NCO/OH ratio of less than 1.2, suitably from 0.8 to about 1.1, more suitably from about 0.85 to about 0.99, more suitably from about 0.80 to about 0.90.

Suitably, the reaction takes place in the presence of a catalyst. Catalysts may be used to speed up the polymerization reaction and any of those catalysts normally used by those skilled in the art may be employed. For example, suitable catalysts include dibutyltin dilaurate, $FeCl_3$, stannous octoate, tertiary amines such as triethylamine and the like. In one highly preferred embodiment, the catalyst is dibutyl tin dilaurate (DBTDL).

Suitably, the catalyst is used in an amount of from about 0.01 wt % to about 2.0 wt %, or from about 0.01 wt % to about 1.0 wt % of the reactants, more suitably, from about 0.03 to about 0.8 wt %, even more suitably from about 0.05 wt % to about 0.5 wt %, more suitably still, from about 0.05 wt % to about 0.2 wt %, more suitably about 0.05 to about 0.1 wt % of the reactants. In one highly preferred embodiment, the catalyst is used in an amount of about 0.05 wt % of the reactants.

Suitably, the reaction mixture is in the form of a dry mixture, i.e. the mixture is substantially anhydrous and substantially excludes water. Suitably, the components of the reaction mixture collectively are liquid at ambient temperature.

The reaction of the invention proceeds with the di-isocyanate reacting randomly with the reactive groups of the silicone containing compound(s) and other coreactants, including PEG and the chain extender, to eventually form a thermoplastic polymer matrix/material. Advantageously, the resulting polymer matrix allows high flux of oxygen, resulting in a high DK lens.

Silicone Containing Compound of Formula J

The polymeric material of the present invention is prepared from at least one silicone containing compound of formula J

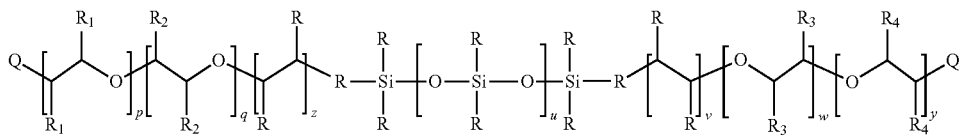

Where each R, $R_1$, $R_2$, $R_3$ and $R_4$ group independently represents a hydrocarbyl group (generally a small alkyl group) or H;

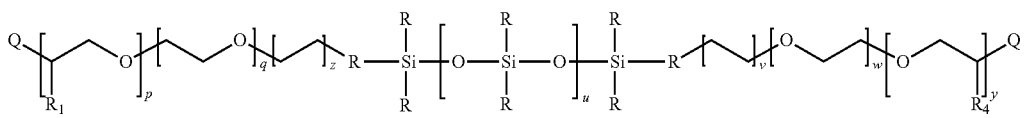

p is an integer from 0 to 40, suitably 1 to 10;
q is an integer from 0 to 40, suitably 1 to 10;
z is an integer from 1 to 50, generally 1 to 10, suitably 1 to 3;
u is an integer from 1 to 100, suitably 10-40 to 20 even more suitably 1-10;
each Q group independently represents a COOH, OH, SH, $NH_2$, NHR or NCO group, typically each Q represents OH; and
wherein at least one $R_1$ group represents a hydrocarbyl group and p represents an integer of from 1 to 40, or at least one $R_2$ group represents a hydrocarbyl group and q represents an integer of from 1 to 40; and
at least one $R_3$ group represents a hydrocarbyl group and w represents an integer of from 1 to 40, or at least one $R_4$ group represents a hydrocarbyl group and y represents an integer of from 1 to 40;

Generally each R, $R_1$, $R_2$, $R_3$ and $R_4$ group independently represents H or an alkyl group (suitably a small alkyl group such as a methyl, ethyl or propyl group).

Typically at least one R1 group and at least one R4 group represent a hydrocarbyl group; p represents an integer of from 1 to 40 and y represents an integer of from 1 to 40.

Suitably at least one R2 group and at least one R3 group represent a hydrocarbyl group; q represents an integer of from 1 to 40 and w represents an integer of from 1 to 40.

Generally the silicone containing compound is symmetrical but non symmetric structure bearing silicone compounds may also be employed.

According to one embodiment, where R1 and/or R2 represent a hydrocarbyl group, p and q independently represent an integer of from 1 to 5 respectively, and w and y independently represent an integer of from 1 to 10, generally of from 5 to 10 respectively.

According to one embodiment, where R3 and/or R4 represent a hydrocarbyl group, w and y independently represent an integer of from 1 to 5 respectively, and p and q independently represent an integer of from 1 to 10, generally of from 5 to 10 respectively.

Generally Q represents OH or $NH_2$, typically OH.

According to one embodiment, the silicone containing compound is of Formula Ji:

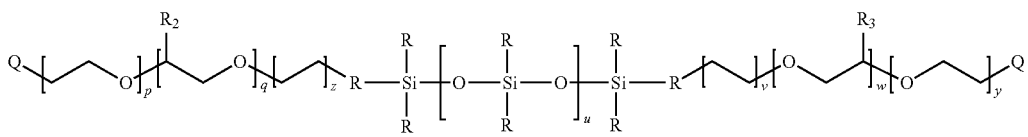

Where R1 and R4 represent a hydrocarbyl group, generally an alkyl group, typically a small alkyl group such as methyl, ethyl or propyl;
p represents an integer from 1 to 40, typically 1 to 10;
y represents an integer from 1 to 40, typically from 1 to 10;
q represents an integer from 1 to 40, generally 5 to 10;
w represents an integer from 1 to 40, generally 5 to 10;
Q, z, R, u and v are as defined above.

According to a further embodiment, the silicone containing compound is of Formula Jii:

Where R2 and R3 represent a hydrocarbyl group, generally an alkyl group, typically a small alkyl group such as methyl, ethyl or propyl;
q represents an integer from 1 to 40, typically 1 to 10;
w represents an integer from 1 to 40, typically 1 to 10;
p represents an integer from 1 to 40, generally 5 to 10;
y represents an integer from 1 to 40, generally 5 to 10;
Q, z, R, u and v are as defined above.

Typically the silicone containing compound has the structure of Formula Jiii:

HO—$(CH(R_1)CH_2O)_p$—$(CH_2CH_2O)_q$—$(CH_2)_z$—Si$(R_1)_2$—$(OSi(R_1)_2)_u$—O—Si$(R_1)_2(CH_2)_v$—$(OCH_2CH_2)_w$—$(OCH_2CH(R_1))_y$—OH where each $R_1$ group is an alkyl group, typically a small alkyl group.

Suitable compounds are available from Siltech Corporation under the trade name Silsurf. Silsurf (Silsurf 2510 being an example) is of formula Jiii above where each R1 group represents a methyl group, z is 25, p is 10 and y is 10.

Alternatively, both p, q, w and y represent zero. In such embodiments, the silicone containing compound does not include a PEG portion, and the reactant mixture generally includes a separate PEG compound.

Generally the silicone containing compound has a number average molecular weight of 500 to 5000, suitably 500 to 3500, typically 800 to 3000.

Typically the composition includes 1 to 5 silicone containing compounds, suitably 2 to 4, more suitably 3 silicone containing compounds.

According to one embodiment, the composition includes more than one silicone containing compound of formula Jiii.

Suitably all of the silicone containing compounds separately have number average molecular weight of less than 5000, generally less than 3000, typically less than 1200,

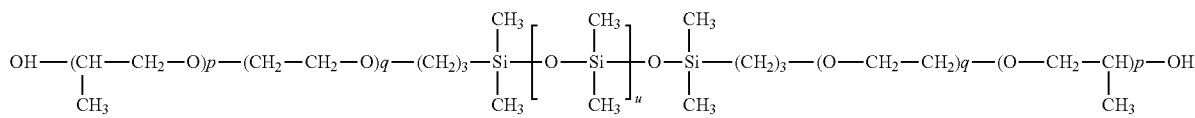

Generally the composition includes a first silicone containing compound having a number average molecular weight of 600 to 900, suitably 700 to 850, more suitably around 800.

Typically the composition includes a second silicone containing compound having a number average molecular weight of 800 to 1000, suitably 850 to 950, more suitably around 900.

Suitably the composition includes a third silicone containing compound having a number average molecular weight of 900 to 1100, suitably 950 to 1050, more suitably around 1000.

According to a further embodiment all of the silicone containing compounds used have separately a number average molecular weight of less than 1000 to 5000, typically 1500 to 3000.

Generally the composition includes a first silicone containing compound having an average number molecular weight of 1700 to 2000, suitably 1800 to 1900, more suitably around 1850 to 1900.

Typically the composition includes a second silicone containing compound having a number average molecular weight of 1900 to 2100, suitably 1950 to 2050, more suitably around 2000.

Suitably the composition includes a third silicone containing compound having a number average molecular weight of 2800 to 3200, suitably 2900 to 3100, more suitably around 3000.

According to one embodiment the, or one of the silicone containing compounds has the structure of formula B:

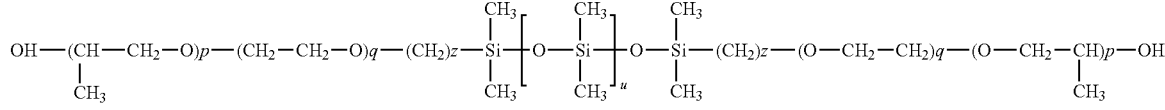

Wherein:
p represents and integer from 1 to 40;
q represents an integer from 0 to 40;
z is an integer from 1 to 50, generally 1 to 10, suitably 1 to 3; and
u is an integer from 1 to 100, suitably 10 to 40, typically 1 to 10.

Alternatively, the silicone containing compound may be of the structure above where the (O—CH2-CH($CH_3$)) group change position with the ($CH_2$—$CH_2$—O) group.

According to one embodiment, the silicone containing compound is of formula B where p and q are 0. In such embodiments, the silicone containing compound does not include a PEG portion, and the reactant mixture generally includes a separate PEG compound.

Advantageously the one or more silicone containing compound has the structure of formula Bi:

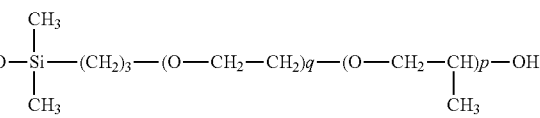

Where p and q independently represent an integer from 1 to 10.

Suitably the reactant mixture comprises one to five silicone containing compound compounds of formula B, suitably one to three silicone containing compound compounds of formula Bi.

Alternatively or additionally the, or one of the silicone containing compound compounds may have the structure of formula C:

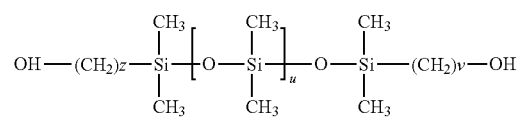

Where z and v independently represent an integer from 1 to 50, generally 1 to 10, suitably 1 to 3; and
u represents an integer from 1 to 100, suitably 10 to 40, typically 1 to 10.

Advantageously the one or more silicone containing compound has the structure of formula Ci:

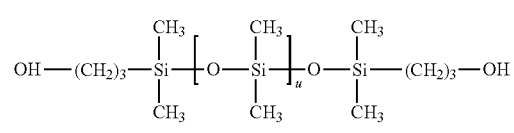

Where u represents an integer from 1 to 100, suitably 10 to 40, typically 1 to 10.

Suitably the reactant mixture comprises one silicone containing compound of formula C, and one to three silicone containing compounds of formula B.

Generally the silicone containing compound has a molecular weight of 500 to 10000, typically 1000 to 7000.

Typically the alkyl groups of the silicone containing compound are small alkyl groups. According to one embodiment, the silicone containing compound is a polydialkyl siloxane diol, typically a polydimethyl siloxane diol.

Generally the non-siloxane content of the silicone containing compounds is 10 to 60 wt % or more.

In addition to the silicone containing compound compounds of formula A, the reactant mixture may also comprise one or more additional silicone containing compounds, in particular one or more of dimethylsiloxane-ethylene oxide block/graft copolymers, ethylene oxide-dimethylsiloxane-ethylene oxide block polymers and poly dimethylsiloxane dicarbinol(mono) terminated compounds.

According to one embodiment, in addition to the silicone containing compounds of formula J, the reactant mixture also comprises one or more compounds of formula V or VI:

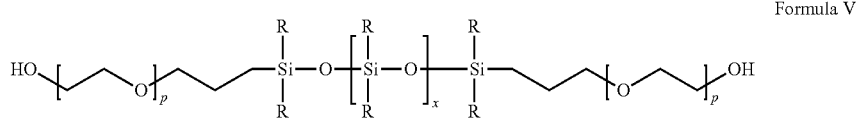

Formula V where R is alkyl, p is an integer from 1 to 110 and x is an integer from 1 to 324.

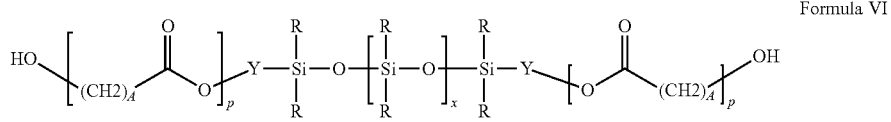

Formula VI where R represents a small alkyl group, typically methyl, Y represents an alkyl group, p is an integer from 1 to 110, x is an integer from 1 to 324 and A is an integer from 1 to 25.

Silicone Containing Compounds of Formula I

According to one embodiment, the polyurethane xerogel of the present invention comprises a compound of Formula I, and/or is prepared from a mixture comprising a silicone containing compound of Formula I:

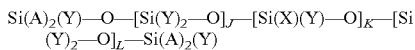

Where each A group independently represents an optionally substituted hydrocarbyl group, typically a small, optionally substituted alkyl, aryl or alkoxy group, generally a small alkyl group (i.e. methyl, ethyl, propyl, butyl etc.), or an acetoxy group;
X represents an ether containing hydrocarbyl group,
Each Y group independently represents an X group (as defined above), or an A group (as defined above),
J represents an integer from 0 to 100, generally 0 to 50,
K represents an integer from 1 to 100, generally 1 to 50,
L represents an integer from 0 to 100, generally 0 to 50.

The X group may comprise repeating —(CH$_2$)$_m$O— units where m typically represents an integer from 1 to 50, suitably 1 to 20, generally 1 to 10. Suitably X represents a PEG group, which may include a small alkyl group such as a propyl group to link the PEG group to the siloxane backbone.

The X group may be terminated with a functional group capable of taking part in the polymerisation reaction used to cure the polyurethane xerogel. Suitable functional groups include COOH, OH, SH, NH$_2$, NHR and/or NCO functional groups (where R represents an alkyl group). Generally X is terminated with an OH or NH$_2$ group, typically an OH group.

According to one embodiment, the X group comprises a terminal hydroxyl group. Alternatively, the terminal hydroxyl group may be capped, for instance with a small alkyl group, typically methyl. As such the X group may comprise a terminal ether group.

Generally at least 95% of the A groups of Formula I independently represent an optionally substituted small alkyl group (i.e. methyl, ethyl, propyl, butyl etc.); typically at least 99%; suitably all of the A groups of Formula I represent an optionally substituted small alkyl group.

According to one embodiment, Y represents A.

Alternatively some or all of the Y groups represent X.

Generally the compound of Formula I comprise 1 to 3 ether containing hydrocarbyl groups, that is 0 to 2 of the Y groups represent X. Suitably the compound of Formula I comprises 1 or 2 ether containing hydrocarbyl groups.

According to one embodiment, the silicone containing compound of Formula I has the structure of Formula II:

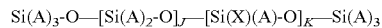

Where A, X, J, K and L are as defined above.

Generally each A group represents a small alkyl group, in particular methyl, ethyl or propyl.

Alternatively, each A group may represent an acetoxy group:

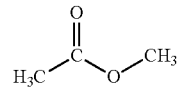

According to one embodiment the silicone containing compound of Formula I has the structure:

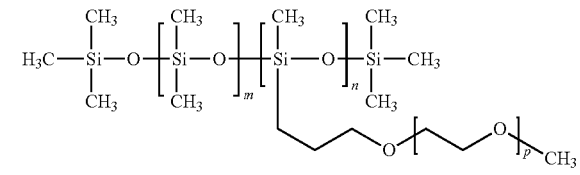

According to one embodiment the silicone containing compound of Formula I has a number average molecular weight of 100 to 7000, suitably 300 to 1000, typically 500 to 700, generally around 600.

Suitable silicone containing monomers having the structure of formula I are sold under the trade name DBE 712, capped '(DIMETHYLSILOXANE)-(ETHYLENE OXIDE) BLOCK COPOLYMER', and may be purchased from Gelest Incorporated.

Typically the composition includes 1 to 5 silicone containing compounds according to Formula I, suitably 1 to 3, more suitably 1 silicone containing compound according to Formula I.

Suitably all of the silicone containing compounds according to Formula I separately have a number average molecular weight of 100 to 1500.

Generally the percentage silicone content of the silicone containing monomer compounds is 10 to 50 wt %, generally 20 to 40 wt %.

Polyethylene Glycol

The present invention may involve the use of at least one poly(ethylene glycol) (PEG) compound.

Suitably, the polyethylene glycol has a molecular weight of from about 200 to about 20,000, more suitably from about 500 to about 8000, even more suitably from about 600 to about 3500.

Alternatively or additionally, the poly(ethylene glycol) compound may have a number average molecular weight of from about 500 to about 8000, suitably from about 4000 to about 8000.

Polyethylene glycols of varying molecular weights are commercially available and can be used to afford the polymeric materials of the present invention. Blends of two or more different molecular weight polyethylene glycols can also be used.

According to one embodiment more than one polyethylene glycol of differing molecular weights are used. Typically, the molecular weight of the polyethylene glycol(s) used to form the polymer of the present invention is/are less than 8000, generally less than 4000. Suitably the molecular weight of the polyethylene glycol(s) used to form the polymer of the present invention is/are from about 100 to about 6000, generally from about 200 to about 3500.

The reactant mixture may comprise a low molecular weight PEG compound, typically having a number average molecular weight of less than 1000, and a high molecular weight PEG compound, typically having a number average molecular weight of more than 5000.

According to one embodiment, the reactant mixture of the present invention includes a first PEG compound having a number average molecular weight of 4000 to 6500, generally 5000 to 6000, and a second PEG compound having a number average molecular weight of 100 to 500; generally 100 to 300, suitably around 200. The reactant mixture may also include a third PEG compound, generally having a number average molecular weight of 2500 to 4500, generally 3000 to 4000, suitably 3000 to 3500, typically around 3350.

The use of PEG compounds having more than one molecular weight in the composition allows the compatibility of the various components of the composition to be maintained, including the silicone containing components.

Finally the relatively higher molecular weight PEG (i.e. PEG 5000 to 6000) within the composition allows the water content of the lens to be tailored. This is an attribute that plays a very important role in the movement of articles of manufacture placed on or in a human or animal body, and promotes comfort to wearer. Secondly the use of the higher molecular weight PEG compound within the composition allows the modulus of the material to be controlled and tailored.

In one embodiment, the reactant mixture comprises three PEG compounds having a number average molecular weight of PEG 5500 to 6000 (typically PEG 5767), PEG 100 to 300 (typically PEG 200) and PEG 3000 to 4000 (typically PEG 3350) respectively.

In general, silicone hydrogel based lenses are weaker in strength than those based on non silicone hydrogels due to lower cohesive energy density of the silicones. Also lenses made: from linear silicone hydrogel polymers are relatively weaker than the crosslinked polymers. This is because in the linear polymers, the strength largely comes from inter/intra molecular interaction largely due to hydrogen bonding between the interacting groups, which is much weaker than obtained through a covalent chemical bond. These interacting groups include the urethane segments within the polymer backbone. The higher the urethane segments within the polymer backbone the higher the strength, therefore the use of lower molecular weight PEGs affords more urethane segments after reacting with the isocyanate, hence lenses with appropriate strength can be achieved. But in addition, the high concentration of the urethane hard segments can associate to form aggregates (domains) in the soft segment matrix, which also become more self-associated in the process. These phenomena may give rise to detectable hetrophase morphology in polyurethanes, resulting in opacity in the hydrated polymers if the domain size gets bigger than wave length of light. However in the present invention surprisingly, the opacity due to domain formation does not occur despite the high concentration of the urethane groups that arise as a result of reacting lower molecular weight PEGs and isocyanate.

The use of PEG compounds having more than one molecular weight in the composition allows the compatibility of the various components of the composition to be maintained, including the silicone containing components.

Finally the relatively higher molecular weight PEG (i.e., PEG 3350) within the composition allows the water content of the lens to be tailored. This is an attribute that plays a very important role in the movement of lens when placed on-eye and provides comfort to wearer. Secondly the use of the higher molecular weight PEG compound within the composition allows the modulus of the material to be controlled and tailored. Furthermore, higher molecular weight PEG within a composition imparts crystallinity which plays an important part in providing strength to the resulting xerogel. This attribute may provide ease in demoulding the lens from a given mould cavity e.g., in a injection moulding process.

Moreover, the use of several silicone containing monomers (i.e. compounds of formula J with various PDMS fractions) in the present invention affords compatibility, as well as allowing the overall silicone content to be increased to a level that generates a final polymer with the desired material properties, including suitably a high DK.

According to one embodiment, the PEG is selected from PEG 3350 and PEG 2100.

Suitably, the polyethylene glycol is used in an amount of from about 5 to about 80 wt % of the reactants, more suitably from about 10 to about 70 wt %, more suitably from about 20 to about 60 wt %, more suitably still, from about 25 to about 50 wt % of the reactants. According to one embodiment, the polyethylene glycol is used in an amount of from about 10 to about 25 wt %, suitably, from about 15 to about 25 wt % or more of the reactants.

Where the reactant mixture comprises a silicone containing compound of Formula J, the amount of PEG compound in the reactant mixture may be 30 wt % or less, typically 25 wt % or less, generally 15 to about 25 wt % of the reactant mixture.

In general, silicone hydrogel based lenses are weaker in strength than those based on non silicone hydrogels due to lower cohesive energy density of the silicones. Also articles formed from linear silicone hydrogel polymers are relatively weaker than crosslinked polymers. This is because in the linear polymers, the strength largely comes from hydrogen bonding between the interacting groups (which is much weaker than a chemical bond). These interacting groups include the urethane segments within the polymer backbone. The higher the urethane bonds within the polymer backbone the higher the strength, therefore the use of lower molecular weight PEGs affords more urethane segments after reacting with the isocyanate, hence lenses with appropriate strength can be achieved. But in addition, the higher concentration of urethane hard segments can associate to form aggregates (domains) in the soft segment matrix, which also become more self-associated in the process. These phenomena give rise to detectable hetrophase morphology in polyurethanes, resulting in opacity in the hydrated polymers if the domain size gets bigger than wave length of light. However, in the present invention surprisingly, the opacity due to domain formation does not occur despite the high concentration of the urethane groups that arise as a result of reacting lower molecular weight PEGs and an isocyanate compound.

The use of PEG compounds having more than one molecular weight in the composition may be one way of ensuring compatibility of the various components of the composition to be maintained, including the silicone containing components.

Moreover, the reactant mixture of the present invention affords compatibility, as well as allowing the overall silicone content to be surprisingly high whilst retaining good transparency and light transmission properties. The relatively high silicone content of the final polymer, allows the final polymer to have the desired material properties, typically including a relatively high DK required for ocular health.

Polyfunctional Compound

The polyfunctional compound has an average functionality of at least two, generally 2.5 or more, typically 2.7 or more, suitably 3 or more, more suitably 3 to 4. Generally, the polyfunctional compound has an average functionality of around 3.

According to one embodiment, the polyfunctional compound has a number average molecular weight of 1500 or less, typically 1000 or less; generally 500 or less.

The polyfunctional compound may have a molecular weight from 90 to 1500; generally 90 to 1000; typically 90 to 700. Generally the polyfunctional compound may have a number average molecular weight of less than 300.

The polyfunctional compound comprises more than two functional groups capable of reacting in polymerization; typically the polyfunctional compound comprises three functional groups capable of reacting in polymerisation. The polyfunctional compound may include functional groups such as hydroxyl, isocyanate and amine. According to one embodiment, the polyfunctional compound comprises one or more of the following types of functional group: COOH, OH, SH, $NH_2$, NHR (where R represents an alkyl group, in particular a small alkyl group, suitably methyl) and NCO. Alternatively or additionally any other group capable of reacting with the coreactants under the conditions of the polymerization reaction.

According to one embodiment, the polyfunctional compound comprises isocyanate and/or hydroxyl functional groups; generally hydroxyl functional groups.

Generally the polyfunctional compound comprises three of the same functional group.

Generally the polyfunctional compound comprises three hydroxyl functional groups.

Alternatively the polyfunctional compound may comprise a mixture of different functional groups.

Conventional crosslinking agents may be used as the polyfunctional compound, such as alkanes, (triols, trithiols, triamines, triamides, tricarboxylic acids), allkenes, (triols, trithiols, triamines, triamides, tricarboxylic acids), and/or alkynes (triols, trithiols, triamines, triamides, tricarboxylic acids).

Examples of suitable polyfunctional compounds include, but are not limited to, alkane triols such as hexanetriol (HT), trimethylol propane (TMP), glycerol and multifunctional isocyanates, typically tri-isocyanates.

According to one embodiment, the polyfunctional compound is TMP.

According to a further embodiment, the polyfunctional compound is HT.

The polyfunctional compound may be of formula A:

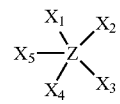

Formula A wherein at least three of $X_1$, $X_2$, $X_3$, $X_4$ and $X_5$ are each independently an OH, $NH_2$, COOH, SH, NHR (where R represents an alkyl group, in particular a small alkyl group, suitably methyl) preferably OH— or $NH_2$-terminated group, and the remainder of $X_1$, $X_2$, $X_3$, $X_4$ and $X_5$ are each independently H or absent, and Z is a central linking unit. Typically at least three of $X_1$, $X_2$, $X_3$, $X_4$ and $X_5$ are each independently an OH— or $NH_2$-terminated polyoxyalkylene group.

The polyol is a moiety comprising initiating hydroxyl groups attached to a central linking group, which is generally essentially hydrocarbon. The finally produced central linking moiety Z is generally devoid of active hydrogen atoms, that is hydrogen atoms which can initiate polymerisation. Z may contain groups that are inert to reaction with NCO groups or the polyoxyalkylene chains which are being polymerised or copolymerised. Generally the Z group has a molecular weight of 1500 or less.

Generally the polyfunctional compound has a molecular weight of 90 to 500 $gmol^{-1}$, typically 90 to 200 $gmol^{-1}$.

According to one embodiment, the polyfunctional compound is a polyol having three hydroxyl functional groups.

According to one embodiment, the polyfunctional compound is a polyol such as glycerol, trimethylpropane (TMP) or hexanetriol (HT). The polyol is generally liquid (e.g. HT) or solid (e.g. TMP) at ambient temperature or temperatures slightly above (20 to 40° C.).

The polyfunctional compound may be a trifunctional isocyanate.

In particular, the polymer composition of the invention may be prepared using at least one poly-isocyanate i.e., having more than two functional reactive groups. Typically, the poly-isocyanate is an organic poly-isocyanate. In such embodiments, the polyfunctional compound is generally a poly-isocyanate. The reactant mixture generally also comprises a di-isocyanate compound.

The poly-isocyanate performs a number of different functions. Firstly, it acts as a coupling agent for the diol component to produce the soft segment. Secondly, it acts as a coupling agent to produce urethane-rich hard segments.

Thirdly, it acts as a coupling agent for the soft and hard segments to build up the molecular weight of the resulting polymer. It may also act as a crosslinker, in this case a di-isocyanate and a poly-isocyanate may be included in the reactant mixture.

Suitable poly-isocyanates for use in the compositions of the present invention include, trifunctional trimer (isocyanurate) of isophorone diisocyanate, trifunctional trimer (isocyanurate) of hexamethylene diisocyanate and polymeric 4,4'-diphenylmethane diisocyanate.

More suitably, the poly-isocyanate is aliphatic. Typically, the poly-isocyanate is liquid at ambient temperature.

The polyisocyanate may be partially or completely blocked and activated in situ by the use of heat and/or chemical stimuli. Suitable blocked isocyanate compounds are sold by Baxenden under the trade name Triexene (see for instance, Triexene B1795 and B 17960.

According to one embodiment, all of the functional groups of the polyfunctional compound may be blocked prior to formation of the reactant mixture.

According to a further embodiment, some of the functional groups of the polyfunctional compound groups are blocked prior to the formation of the reactant mixture.

The functional groups may be blocked with any suitable compound which prevents reaction of the relevant functional groups under the reaction conditions generally used to form the polymer of the invention prior to activation of the functional group. Typically activation involved exposure of the polyfunctional compound to heat and/or chemical activation agents. Generally the blocked functional groups are activated through thermal activation.

Generally, the poly-isocyanate is used in an amount of from about 0.04 to about 5 wt %, suitably from about 0.05 to about 3 wt %. The amount of poly-isocyanate in any given composition can be adjusted to modify the properties/attributes of the resultant polyurethane composition.

Generally the polyfunctional compound has a number average molecular weight of less than 300, typically less than 250, suitably less than 200.

According to one embodiment, the polyfunctional compound may comprise silicone. Typically it may comprise at least one silicone group.

According to one embodiment, the polyfunctional compound may be an alkyl terminated silicone with at least three hydrocarbyl substituents, terminated with a group which polymerises under the reaction conditions used to polymerise the reactant mixture. Generally the hydrocarbyl group is terminated with a COOH, OH, SH, NH$_2$ or NCO or NCHR group (where R represents alkyl, suitably a small alkyl group), typically an OH or NH$_2$ group, suitably an OH group.

According to one embodiment, the polyfunctional compound comprises three hydroxyl, amine or isocyanate functional groups.

Generally the non-silicone content of the polyfunctional compound is 10 to 60 wt %.

Generally the functional groups of the polyfunctional compound (generally hydroxyl groups), react with the isocyanate groups forming urethane groups. The multifunctionality of the polyfunctional compound produces cross-linked or branched polymer matrix. In general, the overall degree of crosslink density of the resultant material determines the associated material strength of the resultant materials.

Generally the reactant mixture used to form the polymer of the present invention comprises 5 wt % or less polyfunctional compound; typically 4 wt % or less; generally 3 wt % or less. According to one embodiment the polyfunctional compound is present at an amount of 0.05 to 2 wt % of the reactant mixture, generally 0.5 to 1.5 wt %

According to one embodiment, the reactant mixture used to form the polymer of the present invention comprises 2 wt % or less polyfunctional compound.

The reactant mixture used to form the polymer generally comprises 0.5 to 2 wt % polyfunctional compound.

The reactant mixture used to form the polymer of the present invention generally comprises 5 wt % or less of any compound having an average functionality of more than 2 (typically having a functionality of 3 or 4). Generally the reactant mixture comprises 3 wt % or less of any compound having an average functionality of more than 2; typically 2 wt % or less of any compound having an average functionality of more than 2.

Generally the polyfunctional compound is the only species in the reactant mixture having an average functionality greater than 2.

According to one embodiment, the polyfunctional compound may represent more than one compound which may each have the same or a different average functionality.

Generally the moulded articles of the present invention have an associated tear strength of at least 5 Pa, typically 7 Pa or more, suitably 8 Pa or more. Typically the moulded articles of the present invention have an associated DK of at least 50 Barrer and typically have a water content of more than 10 wt %.

The incorporation of a polyfunctional compound within the reactant mixture produces cross-linking in the resultant composition. In general cross-linked, thermoset compositions degrade at temperatures lower than their melting temperatures. It is not possible to make cross-linked, thermoset compositions flow without causing degradation to the composition, and therefore compositions comprising a large degree of cross-linking are not thermoplastic, and are not suitable for injection moulding techniques. The polyurethane compositions of the present invention may be thermoset, or thermoplastic. The polyurethane compositions of the present invention may be fully or partially cross-linked.

Generally the polyurethane compositions of the present invention are partially cross-linked.

Chain Extender

The polymer composition of the invention may be prepared using at least one chain extender comprising one or more of COOH, OH, SH, and NH$_2$ terminal groups, generally at least one diol, in particular at least one diol of formula D,

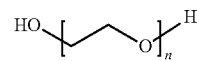

wherein n is an integer from 1 to 25, suitably 2 to 25, suitably 2 to 10, more suitably 2 to 4. Where n is 2 or more, the diol includes one or more ether groups. The presence of such ether groups increases the hydrophilicity of the resultant composition.

In one embodiment, the diol is ethylene glycol (EG), i.e. n is 1 or diethylene glycol (DEG), i.e. n is 2.

In one embodiment, the diol is triethylene glycol (TEG), i.e. n is 3. Advantageously, compositions derived from TEG produce thermoformable polymers that show high light transmissibility in the fully water swollen state.

In one embodiment, the diol is a PEG compound, suitably having a molecular weight of 500 or less, suitably 100 to 300, generally around 200. Such a PEG compound is similar to tetraethylene glycol (TTEG), i.e. n is 4.

Typically, the reactant mixture comprises from 2 to about 20 wt % chain extender generally from about 2 to about 15 wt % of the reactants.

Generally, the chain extender is used an amount of from 2 to about 15 wt % of the reactants, more suitably from about 2 to about 13 wt % of the reactants.

Where the diol is EG, it may be used in an amount of from about 2 to about 10 wt % of the reactants, generally from about 2 to about 6 wt % of the reactants.

Where the diol is DEG, it may be used in an amount of from about 5 to about 20 wt % of the reactants, generally from about 10 to about 16 wt % of the reactants.

Where the diol is TEG, it may be used in an amount of from about 8 to about 45 wt % of the reactants, generally from about 14 to about 30 wt % of the reactants, typically, from about 15 to about 25 wt % of the reactants.

Where the diol is TTEG, it may be used in an amount of from about 1 to 20 wt % of the reactants, generally from about 2 to about 13 wt % of the reactants.

According to one embodiment, the reactant mixture may comprise more than one chain extender compound.

Suitably the chain extender is an alkane diol or triol compound. The alkane group of the alkanediol may suitably have a carbon backbone of 2 to 10 carbon atoms, generally 2 to 5 carbon atoms.

According to one embodiment, the reactant mixture comprises a butanediol compound.

Where the reactant mixture comprises an alkanediol compound, it may be present in an amount of 1 to 10 wt % of the reactant mixture, typically 1 to 5 wt %.

The reactant mixture may comprise an amine terminated chain extender. This is particularly suitable to promote the generation of urea groups in the resultant polymer.

Incorporation of an amine terminated chain extender in the reactant mixture may increase the level of hydrogen bonding in the resultant polymer. The level of covalent cross-linking in the resultant polymer may be decreased accordingly.

Suitably the amine terminated chain extender may have the structure:

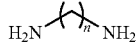

Where n represents an integer of 2 to 50, generally 2 to 20, typically 2 to 12.

According to one embodiment, the amine terminated chain extender is ethylenediamine. In the above structure one $NH_2$ group may be replaced with other functional group e.g., OH group such as in monoethanolamine.

Alternatively or additionally, the amine terminated chain extender may be an amine-terminated poly (ethylene glycol) or an amine terminated poly (propylene glycol) compound.

According to one embodiment, the chain extender may comprise two different terminal groups, for instance one amine group and one hydroxyl groups.

The chain extender may have the structure:

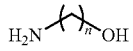

Where n represents an integer of 2 to 50, generally 2 to 20, typically 2 to 12.

The proportion of the diol within a given composition can also affect the material properties. The diol reacts with NCO groups (e.g. Desmodur W) to form the "hard" blocks within the resultant polymer matrix that affords the strength (tensile properties) to the material. The skilled person would thus appreciate that the proportion of the given diol can be adjusted in order to fine tune the tensile and other properties of the resulting material.

Additional Components

In one embodiment, the composition further comprises one or more antioxidants. Suitable antioxidants include those generally used for polyurethanes. Particular mention may be made of polysiloxane urethanes including BHA (butylated hydroxyl anisole), BHT (butylated hydroxytoluene) and ascorbic acid etc. Suitably, the antioxidant is BHA.

Suitably, the antioxidant is used in an amount of about 0.01 to about 10 wt % of the reactants, more suitably from about 0.1 to about 5 wt %, even more suitably from about 0.2 to about 1 wt % of the reactants in any given composition.

According to one embodiment of the present invention, the antioxidant is present at an amount of about 1.0 to about 3.0 wt % of the reactants.

In one embodiment of the invention, the composition further comprises one or more additional components such as a modulus modifier, plasticizer, humectant, lubricant, process aid, viscosity reducer, compatibility enhancer and/or polymer matrix structure modifier. Suitably, the additional component is present in an amount of 0 to about 20 wt %, more suitably from about 2.5 to about 10 wt %, more suitably still, about 4 to about 6 wt % of the reactants.

Suitable modulus modifiers include components that alter the modulus property of the polyurethane and may also alter the oxygen permeability property. In one embodiment, the additional component is poly(ethylene glycol) dimethyl ether (PEG DME), which can act as a modulus modifier, plasticizer, humectant/lubricant, process aid, viscosity reducer, compatibility enhancer and polymer matrix structure modifier. PEG DMEs of various molecular weights (e.g. 250, 500, 1000, 2000) are commercially available and are suitable for use in the present invention. Generally, for the purposes of the present invention, the PEG DME has a molecular weight of 1000 (e.g. PEG DME-1000). As an alternative, polyethylene glycol dibutyl ether can also be used. The modulus modifier may be a PDMS based compound with a polyoxy alkylene group with a terminal OCH3 group, such as polydialkyl siloxane compound of Formula B.

Advantageously, the incorporation of PEG DME into the polymer compositions of the invention leads to lenses having a reduced modulus. Typically, the modulus of lenses prepared from the polymer compositions of the invention is from about 0.1 to about 1.2 MPa, generally about 0.3 to about 0.8 MPa, suitably from about 0.4 to about 0.5 MPa.

In one embodiment, the composition of the invention further comprises one or more tinting agents. By way of example, suitable tinting agents commonly used in the contact lens industry include the following: benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl); [2-naphthalene-sulfonic acid, 7-(acetylamino)-4-hydroxyl-3-((4-((sulfo-oxyethyl)sulfonyl)phenyl)azo)-]; [5-((4,6-dichloro-1,3,5-triazin-2-yl)amino-4-hydroxy-3-((1-sulfo-2-naphthalenyl)azo-2,7-naphthalene-disulfonic acid, trisodium salt]; [copper, 29H, 31H-phthalocyaninato(2-)-$N_{29},N_{30},N_{31},N_{32}$)-,sulfo((4((2-sulfooxy)ethyl)sulfonyl)-phenyl)amino) sulfonyl derivative]; and [2,7-naphthalenesulfonic acid, 4-amino-5-hydroxy-3,6-bis((4-((2-(sulfooxy) ethyl)sulfonyl)phenyl)azo)-tetrasodium salt].

Suitable tinting agents for use in the present invention include phthalocyanine pigments such as phthalocyanine blue and phthalocyanine green, chromic-alumina-cobaltous oxide, chromium oxides, and various iron oxides for red, yellow, brown and black colours, chromophtal violet and chromophtal oxide green. The use of organic pigments, particularly phthalocyanine pigments, more particularly copper phthalocyanine pigments, and even more particularly copper phthalocyanine blue pigment (e.g., Colour Index Pigment Blue 15, Constitution No. 74160) is preferred. Opaquing agents such as titanium dioxide may also be incorporated. For certain applications, a mixture of colours may be employed for better simulation of natural iris appearance.

In one embodiment, the tinting agent is a handling tint such as Reactive Blue 4.

Generally, the weight percentage of the tinting agent is from about 0.0001% to about 0.08%, more suitably, 0.0001% to about 0.05%. In one embodiment, the tinting agent is present in an amount of from about 0.005 to 0.08 wt %. In one embodiment, the weight percentage of the tint is from about 0.0001% to about 0.04%, generally from about 0.0001% to about 0.03 wt % of the reactants.

In one embodiment, the composition of the invention further comprises one or more UV blockers or UV absorbers. A UV absorber may be, for example, a strong UV absorber that exhibits relatively high absorption values in the UV-A range of about 320-380 nanometers, but is relatively transparent above about 380 nm. Generally, the UV Blocker is a commercially available UV Blocker such as AEHB (acryloxyethoxy hydroxybenzophenone; $C_{18}H_{16}O_5$).

Generally speaking, a UV absorber, if present, is provided in an amount from about 0.5 wt % to about 1.5 wt % or more of the reactants. Generally the compositions include from about 0.6 wt % to about 1.0 wt % UV absorber, more suitably, about 1.0 wt % of the reactants.

The tinting agent and/or UV blockers can be charged into the lenses at the lens hydration stage post polymerisation after formation of the lenses by injection/compression moulding. Alternatively additives (e.g. tinting agents, UV blockers, and others) can be mixed with the molten polymer and extruded prior to pelletisation.

Specific Compositions

According to one embodiment there is provided a polyurethane xerogel prepared from a mixture comprising:
(a) at least one polyethylene glycol having a molecular weight of from 1500 to 3500;
(b) at least one di-isocyanate, suitably hexane diisocyanate;
(c) at least one silicone containing compound of formula J, typically one to three silicone containing compounds of formula B;
(d) at least one diol of formula D,
wherein the polyethylene glycol, di-isocyanate, silicone containing compound and diol are reacted under substantially anhydrous conditions.

According to a further embodiment there is provided a polyurethane xerogel prepared from a mixture comprising:
(a) at least one polyethylene glycol having a molecular weight of from 1000 to 6000, generally 2000 to 2200, typically 2050 to 2150;
(b) at least one di-isocyanate, suitably hexane diisocyanate;
(c) at least one silicone containing compound of formula J suitably one to three silicone containing compounds of formula B;
(d) at least one diol of formula D, typically where n is an integer from 3 to 4,
(e) optionally a catalyst e.g., DBTDL
wherein the polyethylene glycol, di-isocyanate, silicone containing compound and diol are reacted under substantially anhydrous conditions.

According to one embodiment there is provided a polyurethane xerogel prepared from a mixture comprising:
a) at least one silicone containing monomer of Formula J;
b) at least one PEG compound, in particular a high molecular weight PEG compound (generally having a number average molecular weight of 5000 to 7000) and a second PEG compound, typically having a number average molecular weight of 3000 to 4000;
c) optionally at least one silicone containing compound of Formula I, generally of Formula II;
d) a polyfunctional compound having a number average molecular weight of 1500 or less, generally a triol such as TMP or HT, typically TMP;
e) at least one chain extender, typically a diol, generally a low molecular weight PEG compound (generally having a number average molecular weight of 100 to 500);
f) at least one diisocyanate, suitably dicyclohexylmethane-4,4'-diisocyanate (DMDI);
wherein the components of the reactant mixture are reacted under substantially anhydrous conditions to allow curing, wherein the silicone containing compound of formula I is included in the reactant mixture and/or is added after curing.

A reactant mixture used to form an exemplary composition of the present invention comprises:
a. 25 to 50 wt % of at least one di-isocyanate, suitably dicyclohexylmethane-4,4'-diisocyanate (DMDI);
b. 40 to 60 wt % of at least one silicone containing monomer of Formula J;
c. 10 to 20 wt % of a low molecular weight PEG compound (generally having a number average molecular weight of 100 to 500);
d. 1 to 10 wt % of a high molecular weight PEG compound (generally having a number average molecular weight of 5000 to 7000);
e. 0 to 5 wt % of a third PEG compound (generally having a number average molecular weight of 3000 to 4000);
f. Optionally 2 to 20 wt %, generally 15 to 20 wt % of at least one silicone containing compound of Formula I, generally of Formula II;
g. 0.5 to 2 wt % of a polyfunctional compound, generally a triol such as TMP or HT;
h. 0.5 to 5 wt % of at least one chain extender, typically a diol;
i. 0 to 0.5 wt % catalyst
wherein the components of the reactant mixture are reacted under substantially anhydrous conditions to allow curing, wherein the silicone containing compound of formula I is included in the reactant mixture and/or is added after curing. Where the silicone containing compound of Formula I is added only after curing, it is added at an amount of 2 to 20 wt % of the polyurethane composition.

According to one embodiment, the resultant composition has a relatively low silicone content, generally 0.2 to 1 wt %. In such embodiments, a reactant mixture used to form an exemplary composition of the present invention comprises:
a. 20 to 30 wt % of at least one di-isocyanate, suitably dicyclohexylmethane-4,4'-diisocyanate (DMDI);
b. 0.5 to 2 wt % of at least one silicone containing monomer of Formula J;

c. 20 to 40 wt % of a first PEG compound (generally having a number average molecular weight of 5000 to 7000);
d. 20 to 40 wt % of a second PEG compound (generally having a number average molecular weight of 3000 to 5000);
e. 5 to 15 wt % of at least one chain extender, typically a diol;
f. 0.5 to 2 wt % of a polyfunctional compound, generally a triol such as TMP or HT;
g. 0 to 0.5 wt % catalyst.

According to one embodiment, the resultant composition has a relatively high silicone content, generally 30 to 40 wt %. In such embodiments, a reactant mixture used to form an exemplary composition of the present invention comprises:
a. 10 to 20 wt % of at least one di-isocyanate, suitably Desmodur W or dicyclohexylmethane-4,4'-diisocyanate (DMDI);
b. 50 to 70 wt % of at least one silicone containing monomer of Formula J;
c. 5 to 15 wt % of a first PEG compound (generally having a number average molecular weight of 3000 to 5000);
d. 1 to 10 wt % of a second PEG compound (generally having a number average molecular weight of 1000 to 3000);
e. 1 to 5 wt % of at least one chain extender, typically a diol such as a PEG compound having a number average molecular weight of 100 to 300;
f. 0 to 2 wt % of a polyfunctional compound, generally a triol such as TMP or HT;
g. 0 to 0.5 wt % catalyst.

Generally where the components listed in any of the reactant mixtures above form 100 wt % of the reactant mixture.

Alternatively, the components listed above may form up to 90 wt % of the reactant mixture, with the remaining reactant mixture being formed from additional components as described herein.

In another embodiment the hydroxyl containing reactants (including the catalyst) can be jointly dehydrated and made to react with the isocyanate under substantially anhydrous conditions.

In another embodiment the process of manufacturing can be scaled up and a twin screw extrusion method can be used where the dehydrated hydroxyl containing reactants as detailed above can be made to react with the isocyanate containing compound.

Process

Another aspect of the invention relates to a process for preparing a polyurethane xerogel, said process comprising:
(i) preparing a reaction mixture as detailed above; and
(ii) reacting the mixture formed in step (i) under substantially anhydrous conditions to form a polyurethane xerogel.

Generally, the polyurethane xerogel is then processed to form a moulded article such as a contact lens. Suitable processing techniques include cast moulding, injection moulding, compression moulding, spin cast moulding and latching. Additionally, sheets of the polymeric material can be made and devices can be punched out. The sheets of the material can be made by compressing the thermoplastic material between two plates (e.g. Teflon plates) and also from the solution of the material in an organic solvent. In the later case the solvent would require to be evaporated.

Advantageously, the process of the invention involves reacting the reactants under substantially anhydrous conditions to form a polyurethane xerogel, without the addition of water as a reactant. This results in a polyurethane backbone that is substantially free from urea groups, in contrast to methods known in the art. The absence of water (as far as practicable) prevents any significant formation of urea groups which can cause an increase of the swollen water modulus to a degree that is undesirable for contact lenses.

As used herein the term "substantially anhydrous" refers to conditions in which the amount of water is sufficiently low so as to produce a polyurethane backbone that is substantially free from urea groups.

Typically, the reaction takes place with as little water as is practically attainable. Generally, the reaction takes place with as little water as is practically attainable. Suitably, the amount of water in the reaction mixture is less than about 0.3%, more suitably less than about 0.1%, even more suitably less than about 0.05%.

A further aspect of the invention relates to a polyurethane xerogel obtainable by the above described process.

Another aspect of the invention relates to a process for preparing a polyurethane hydrogel, said process comprising preparing a polyurethane xerogel as described above, and hydrating said polyurethane xerogel with an aqueous medium to form a polyurethane hydrogel.

Yet another aspect of the invention relates to a polyurethane hydrogel obtainable by the process described above.

In one preferred embodiment, a catalyst is added to the reaction mixture. Suitable catalysts (together with guidance as to the appropriate amount) are as described above. In one highly preferred embodiment, the catalyst is dibutyl tin dilaurate (DBTDL).

Additional components, such as modulus modifiers, plasticizers, humectants, lubricants, process aids, viscosity reducers, tinting agents, compatibility enhancers and/or polymer matrix structure modifiers as described above, may also be present in the reaction mixture.

As mentioned above, the polymerisation reaction is carried out under substantially anhydrous conditions. Generally, the reactants are dehydrated under vacuum to reduce the water content as far as possible. Suitably, the reactants (e.g. the diol component and the PEG component) are dehydrated under vacuum at elevated temperature using a rotary evaporator. Typically, the reactants are dehydrated under vacuum at a temperature of at least 80° C., more suitably at least 95° C. Generally, the reactants are dehydrated under vacuum at elevated temperature for at least 1 hour, typically, for at least 2 hours, suitably, for at least 4 hours or more. After this dehydration step, the moisture content of the reactants as measured by Karl Fisher is typically <0.050%, suitably, <0.035%. The conditions and timing of the dehydration process will depend upon the equipment used and the weight of material being dehydrated, generally more material will take longer to dehydrate. Optionally other methods e.g., freeze drying etc may also be employed to dehydrate.

In one preferred embodiment, the dehydrated di hydroxy reactants (and optionally the antioxidant and/or plasticiser) are added into a beaker and stirred. The beaker is placed in the oven with circulating Oxygen free dry nitrogen. Suitably, the required quantity of catalyst (e.g. dibutyl tin dilaurate) is then added to the mixture and the moisture content determined using Karl Fischer titration. Typically, the temperature is allowed to reach to about 73° C.$^{+}$-2° C. The beaker is then transferred into a fume hood the contents stirred thoroughly to give a homogenised mixture. The required quantity of the di-isocyanate (e.g. Hexane diisocyanate)) is then added to the mixture and stirred until clear. The mixture is then typically dispensed into pre heated polypropylene tubs that are sealed with lids and reacted to completion in an oven placed in a fume cupboard.

In one preferred embodiment, the reaction takes place at a temperature of from about 70° C. to about 120° C., more suitably, from about 80° C. to about 110° C. In one highly preferred embodiment, the reaction takes place at a temperature of from about 90° C. to about 100° C.

Suitably, the mixture is reacted for about 0.5 to about 24 hours, more suitably, for about 3 to about 12 hours. Even more suitably, the mixture is reacted for at least about 5 hours to about 18 hours, more suitably, for about 8 hours. The disappearance of the NCO absorption band at 2260 cm$^{-1}$ in the FTIR spectrum of the resulting product signifies that the reaction is complete.

The product is allowed to cool to ambient temperature and demoulded, if required after chilling to a reduced temperature.

Suitably, the product is removed from the oven and allowed to cool to ambient temperature.

In one preferred embodiment, the product is cooled to a temperature of from about −30° C. to about −120° C. prior to removing the product from the mould.

Optionally, the product is chilled in a freezer to demould.

The demoulded product is subsequently granulated, suitably at ambient temperature, that produces granules suitable for feeding into an injection moulding machine.

Yet another aspect relates to the use of a polyurethane xerogel or polyurethane hydrogel according to the invention in the preparation of a contact lens.

Process for Preparing a Moulded Article

Another aspect of the invention relates to a process for preparing a polyurethane xerogel in the form of a moulded article, said process comprising the steps of:
(i) preparing a reaction mixture as described above;
(ii) reacting the reaction mixture formed in step (i) under substantially anhydrous conditions to form a polyurethane xerogel; and
(iii) processing the polyurethane xerogel to form a moulded article.

Generally, the polyurethane xerogel is processed in accordance with step (iii) through injection moulding (IM) techniques.

Alternatively, the polyurethane xerogel may be processed in accordance with step (iii) through reaction cast moulding (RCM) techniques.

In one embodiment, the polyurethane xerogel formed in step (ii) is granulated by grinding or the formation of pellets (typically by extruding and chopping to forms pellets suitable for injection moulding), and optionally dried under vacuum, prior to injection moulding. The injection moulding suitably takes place using conventional injection moulding apparatus (such as a BOY 50M), that will be familiar to one of ordinary skill in the art.

A further aspect of the invention relates to a process for preparing a polyurethane hydrogel in the form of a moulded article said process comprising preparing a polyurethane xerogel in the form of a moulded article as described above, and hydrating said moulded article with an aqueous medium to form a polyurethane hydrogel.

Article of Manufacture

Another aspect of the invention relates to an article of manufacture comprising a polymer as described above.

The moulded article may be in the form of a medical device for use in or on the body. The medical device may be exemplified by, but by no means limited to, urinary tract devices (including urethral stents and urinary catheters), ocular devices (including contact lenses and intra-ocular lens shooter devices), intraocular lenses, orthopaedic devices, respiratory devices (including endotracheal tubes), cardiovascular devices, dental devices, neurological devices, gastrointestinal devices, audiology devices, surgical devices, including surgical gloves, foot care devices, wound healing devices, condoms and the like apheresis equipment, blood bags; blood administration tubing; extracorporeal membrane oxygenation equipment; dialysis and peritoneal drainage bags; urinary collection bags; urological catheters; wound drainage bags and tubes; enteral feeding equipment; nasogastric tubes; intravenous catheters, drip chambers, tubing and solution bags; total parenteral nutrition bags; hemodialysis tubing and catheters; film wrap; gloves; endotracheal tubes; tracheostomy tubes; oesophageal tubes; humidifiers; ocular prosthesis; or sterile water bags and tubing.

According to one embodiment the medical devices is a lens, such as a contact lens, a catheter, or an intra-ocular lens shooter device.

Generally, the article of manufacture is in the form of a contact lens.

A contact lens must be permeable to oxygen in order for the lens to facilitate normal corneal metabolism. Generally, contact lenses prepared using the polymer composition of the invention exhibit a DK value of a least 60 Barrers, typically at least 70, suitably, at least 80 Barrers, more suitably the lenses have a DK of at least about 85 Barrers or more.

In the past it has not been possible to obtain a PEG based thermoplastic material with good transparency and an oxygen permeability and associated DK of more than 40 Barrer. There has been a long felt need for materials for use in the manufacture of contact lenses that have high oxygen permeability as it is known that this is associated with good on-eye comfort. However, despite many attempts such a material has, until now, proved elusive.

Due to the use of the particular combination of components detailed above, it is possible to obtain much greater oxygen permeability levels than known thermoplastic PEG based materials used in the manufacture of contact lenses, whilst retaining transparency. In particular the use of the claimed class of silicone containing compound is believed by the applicant to be of particular significance. In addition, the use of PEG: compounds generally having a molecular weight of less than 5000 may also allow the benefits of increased hydrophilicity and good transparency.

In one preferred embodiment, the lenses have a DK of about 60 to about 90 Barrers more suitably, from about 70 to about 90 Barrers or more.

A contact lens must be able to transmit light in the visible region in order to function effectively in correcting visual defects. Suitably, contact lenses prepared using the polymer composition of the invention exhibit a light transmissibility of at least 80%, generally at least 90%, typically, at least 95% or 97%. Suitably, the light transmissibility is from about 90 to about 100%, more suitably from about 95 to about 100%, more suitably still, 100%.

Generally, contact lenses prepared using the polymer composition of the invention exhibit a modulus of from about 0.1 to about 1.50 MPa, typically from about 0.25 to about 0.75 MPa.

The modulus of a contact lens plays a key role in controlling the mechanical properties of a soft contact lens. In addition, the on-eye performance is directly affected by the modulus. A value of greater than 1.25 MPa is likely to cause corneal staining whilst a modulus below 0.1 MPa is likely to lead to a lens with poor handling properties.

Surprisingly the modulus of items of manufacture formed from the materials of the present invention is generally from 0.25 to 0.75 MPa despite the use of relatively high content of poly dimethylsiloxane (PDMS)/silicone.

Generally, contact lenses prepared using the polymer composition of the invention have a water content of 10 to about 90 weight %, typically, from about 20 to about 80 weight %, suitably, from about 25 to about 75 weight %, more suitably, from about 30 to about 70 weight %, more suitably still, from about 30 to about 50 weight %.

The equilibrium water content of the lens is a function of the material properties and plays a key role in determining the bulk, mechanical and physical properties of the lens. Water provides the medium to transmit oxygen and with the modulus governs the on eye properties/performance of the lens. It also plays an important role in the movement of lens when on eye and advantageously the lenses of the current invention provides the optimum level required i.e., ~30 wt % or more.

The present invention is further described with reference to the following non-limiting examples in which:

Table 4 details the stability and clarity of lenses formed from the compositions of the present invention following sterilisation;

Table 5 provides details the contact angles of lenses formed from compositions of the present invention comprising different silicone containing compounds of Formula I.

EXAMPLES

DBE C25 represents Ethylene oxide-dimethylsiloxane-ethylene oxide block polymer (formula VI above),
Silmer OH represents a compound of formula C of the present invention as described above (Mwt=1000 available from Siltech Corporation),
Silsurf 1010 represents a compound of formula Bi having a number average molecular weight of around 800,
Silsurf 1508 represents a compound of formula Bi having a number average molecular weight of around 900,
Silsurf 2510 represents a compound of formula Bi having a number average molecular weight of around 1000,
HDI represents hexamethylene diisocyanate,
DBTDL represents the catalyst dibutyl tin dilaurate, BHA represents the antioxidant butylated hydroxyl anisole,
PEG 200, PEG 600, PEG 2100, PEG 3350 and PEG 6000 represent poly(ethylene glycol) compounds having a number average molecular weight of around 200, 600, 2100, 3350 and 6000 respectively,
DBE 712 is used to refer to '(DIMETHYLSILOXANE)-(ETHYLENE OXIDE) BLOCK COPOLYMER of formula I,
PEGdme 1000 is used to refer to poly(ethylene glycol) di methyl ether compounds having a number average molecular weight of 1000,
DES. W and DMDI are used to refer to the di-isocyanate Desmodur W,
MDI is used to refer to methylene di-isocyanate,
TEG is used to refer to triethylene glycol,
TMP is used to refer to trimethylol propane,
Silicone macromer 1580 is used to refer to a compound of Formula V,
A008AC-UP represents a silicone containing compound having the structure, in particular where one or more of the terminal groups is/are acetoxy capped:

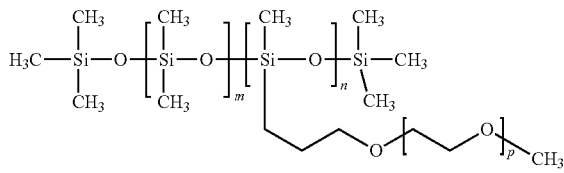

Comparative Example 1

Preparation of Silicone Macromer 1580

The components and actual weights are defined below:
Polydimethylsiloxane hydride terminated (Aldrich 423785)
Polyethylene glycol monoallyl (Polyglycol A500 & A1100 Clariant)
Platinum(0)-1,3-divinyl-1,1,3,3-tetramethyldisiloxane complex solution in xylene, Pt ~2% (Aldrich 479519) (platinum catalyst)

20.050 g of polydimethylsiloxane hydride terminated was added into a three-neck flask and placed in an oil bath. The platinum catalyst was then added. When the temperature of the contents was 50° C., the polyethylene glycol monoallyl A500 (34.527 g) was added drop wise through a syringe needle over a period of fifty minutes while the contents of the flask were stirred with a magnetic stirrer. The temperature of the reaction mixture rose to and was maintained at 65° C. After the addition of the monoallyl polyethylene glycol the reaction temperature was maintained at 65° C. and the reaction was allowed to continue for a further 2 hours. After this time the flask was lifted out of the oil bath and left to cool to ambient temperature.

Comparative Example 2

Method of Manufacturing PEG-Si IM Polymers Based on Silicone Macromer 1580

Poly(ethylene glycol), PEG 6000 (Clariant) was dehydrated under vacuum at 95° C. for four hours and its number average molecular weight ($M_n$) was determined by end group analysis. The analysis afforded number average molecular weight, $M_n$=6088. Similarly, the number average molecular weights were determined for the other polyethylene glycols used and referred here in the examples displayed in the tables below.

Diethylene glycol (DEG), triethylene glycol (TEG), tetraethylene glycol (TTEG), and ethylene glycol (Aldrich) were checked for their moisture content by Karl Fisher and if the water content was <0.035% then these materials were considered to be substantially anhydrous and used without further dehydration, otherwise these were dehydrated under vacuum for a minimum of 2 hours at 95° C. using a rotary evaporator. PEG 3350($M_{n=3350}$) ex Cariant was dehydrated for 4 hours at 95° C. under vacuum or until the low level of moisture content is achieved, typically <0.050%.

Using a Mettler Toledo (AG 285) analytical balance BHA (0.1836 g) was weighed in a weighing boat and added into a quickfit 250 ml flask and then the silicone macromer 1580 (14.1421 g) was added to the same flask. The flask was stoppered and placed in an oven at 95° C. for 15 minutes to dissolve the BHA. Dehydrated TEG (16.186 g) was added to the flask and attached to a rotary evaporator with a bath temperature of 95° C. and the contents of the flask were degassed, carefully rotating, initially giving one or two turns, until the majority of the bubbles have disappeared, then rotating fully to degas over ~5 minutes. Once degassed, DBTDL (0.0576 g) was added through a syringe and a fine needle and mixed by swirling the contents of the flask. Dehydrated molten PEG 3350 (30.48 g) was added to the flask which was degassed again for ~5 minutes. Finally, Desmodur W (33.316 g) was added to the flask through a syringe that contained the appropriate quantity. The flask was stoppered and the contents were mixed by gently rotating the flask to reduce the formation of bubbles.

This mixture was then dispensed into lens molds by the usual method and closed. Separately the remaining material was dispensed into a pre heated polypropylene cup which was covered by a screw cap lid. Both the lens molds and the polypropylene cup were placed in an oven at 95° C. and reacted for 5 hours. The resulting product was in the form of cast moulded lenses and from the polypropylene cup was demoulded by chilling in a freezer at −80° C. over 30 minutes. The lenses were placed directly into glass vials containing saline.

These lenses after 24 hours of hydration appeared transparent, affording UV transmission at 550 nm>95%. The lenses were also used to determine the modulus. The product from the polypropylene cup was granulated using SG Granulator (ex Shini Plastic Technologies Inc.). These granules were charged into a commercial moulding machine (Boy 50M) and female parts using a standard lens mold tool were moulded. These moulded parts on hydration remained transparent.

The granules were also used to manufacture a few lens shaped objects by compression moulding. These lens like objects were used to determine the DK of the material.

These results prove the thermoplasticity of the material. The water content of the moulded part was also determined.

Comparative Example 3

The same method as described above was used to manufacture these compositions except the amounts of the reactants varied according to the values given in Table 1, 2 and 3.

DBE821 represents Dimethylsiloxane-Ethylene Oxide Block/Graft Copolymers (formula V above).

DBEC25 represents Ethylene oxide-dimethylsiloxane-ethylene oxide block polymer (formula VI above).

MCRC61 represents Poly dimethylsiloxane dicarbinol (mono) terminated having the structure:

All of the compositions detailed in Table 3 had an associated DK of less than 40 Barrer. Transparent systems were only achieved where the silicone content of the material was less than 5-6 wt %. For all of the compositions detailed in Table 3, the systems was opaque where the silicone content was greater than 6 wt %.

Example 4

The same method as described above was used to manufacture these compositions except the amounts of the reactants varied according to the values given in Table 4.

Surprisingly, items formed from all of materials detailed in Table 4 were transparent.

Example 5

The reactant mixture as detailed in Table J was formed. Silsurf 1010 is used to refer to a compound of Formula J The reactant mixture had an associated NCO:OH ratio of 1.423:1. The properties of a contact lens formed from the composition are detailed in Table K.

Example 6

The reactant mixture as detailed in Table 6 was formed. The reactant mixture had an associated NCO:OH ratio of 1.423:1. The properties of a contact lens formed from the composition are detailed in Table 7.

Example 7

The reactant mixture as detailed in Table 8 was formed. The reactant mixture had an associated NCO:OH ratio of 1.423:1. The properties of a contact lens formed from the composition are detailed in Table 9.

Example 8

The reactant mixture as detailed in Table 10 was formed. The reactant mixture had an associated NCO:OH ratio of 1.423:1.

Example 9

The reactant mixture as detailed in Table 11 was formed. The reactant mixture had an associated NCO:OH ratio of 1.423:1. The properties of a contact lens formed from the composition are detailed in Table 12.

Example 10

The reactant mixture as detailed in Table 13 was formed. The reactant mixture had an associated NCO:OH ratio of 1.10 to 1.40:1. The properties of a contact lens formed from the composition are detailed in Table 14.

Example 11

The reactant mixture as detailed in Table 15 was formed. The reactant mixture had an associated NCO:OH ratio of 1.10 to 1.40:1.

Example 12

The compositions detailed in Tables 16 to 25 were formed. The reactant mixture detailed in the upper table was formed, and then mixed with the components detailed in the lower table before being moulded using reaction cast moulding techniques. The properties of a contact lens formed from the different compositions were tested and the results are summarised in Table 26.

Example 13

The reactant mixture as detailed in Table X was formed. Differing amounts of silicone containing compound according to Formula I was added to form six different compositions. The properties of a contact lens formed from the six different compositions are detailed in Table Y.

The contact angle of the resultant compositions was assessed. It will be noted that the contact angle decreases as the amount of silicone containing compound of Formula I increases. The MVR of the resultant compositions was tested. The stability and clarity of lenses formed from the compositions were tested.

The composition of Table X was formed using different silicone containing compounds of Formula I. The MVR of the resultant compositions was tested. The stability and clarity of lenses formed from the compositions were tested. The contact angle of the resultant compositions was assessed.

Water Content

Water content is calculated after measurement of dry weight and hydrated weight of a lens by using the following equation:

Water Content (%)=($W_{hydrated\ lens}-W_{dry\ lens}$)/$W_{hydrated\ lens}$×100

Five hydrated lenses, with excess surface water removed, are separately weighed on an analytical balance and average value is taken as $W_{hydrated\ lens}$. The lenses are then dried in an oven at 75° C. for 2 hours and weighed again separately. The average value is taken as $W_{dry\ lens}$.

% Transmittance

% Transmittance was determined under the guidance of ISO 8599 by using a double beam UV spectrophotometer (Jasco V530). A lens is placed into a cuvette containing standard saline solution. The cuvette is placed in the sample compartment. A matching cuvette containing saline is placed in the reference compartment of the UV spectrophotometer and a spectrum as percent transmittance was recorded between 200-780 nm. The test was repeated a further four times and the mean value (% transmittance) at 550 nm was recorded.

DK Measurement

DK Measurement (i.e., oxygen permeability) was carried out by the polarographic technique as briefly described below:

Ten lenses were placed into the Gallenkamp incubator set at 35+/−0.5° C. for 24 hours. The centre thickness (CT) of each of the ten lenses were measured by Rehder ET-3 Electronic Thickness Gauge and these lenses were stacked as follows: A single lens stack, two lens stack, three lens stack, and four lens stack. The CT of each stack was measured three times and a mean value for each was calculated and fed into a spread sheet specifically developed for the method. Also recorded was the atmospheric pressure into the spread sheet. The stack of lenses were replaced into the incubator set at 35+/−0.5° C. and humidity >98%.

Each stack was separately placed on to the electrode (Rehder Permeometer with 8.7 mm electrode) ensuring that there are no bubbles entrapped between the lenses and the electrode. When the current reached its lowest point the reading was recorded in the relevant section of the spread sheet. This test was repeated for all the stacks.

The dark current reading (background) of the measurement system, when no oxygen is able to pass through to the electrode, was recorded and subtracted from all test material current values. Data was analysed taking into consideration the partial pressure of oxygen and the surface area of the polarographic sensor used and finally corrected for the edge effect. A graph of Dk/t corr verses thickness (cm) was then plotted and the inverse of the gradient of the best fit taken to represent the permeability (DK) of the lens material. These values are referred herein as DK (Ocutec).

In parallel, to avoid any discrepancy that may arise from testing in different laboratories and by different operators. Ocutec has measured DK values for the standard known DK products, by the method described above, and has developed a calibration graph (Known DK values vs Ocutec measured DK values) and has used this graph to determine the corresponding DK adjusted value of a given composition.

Therefore, the two DK values for a composition may be provided in some tables (e.g. Tables 5, 7, 9).

Modulus Data

Modulus data was measured for contact lenses prepared in accordance with the invention by tensile testing using the Instron 5842 Tensile testing system with Merlin Software.

Correlation to Standards/Regulation: ISO 9001:2008 (Quality Standards: Par 7.6; ISO 13485:2003 Medical Device Directive: Par 7.6; FDA Part 820 QS Regulation Subpart G: Control of inspection, monitoring and test equipment 820.72.

Sample Preparation

Thickness readings for each lens were obtained using the ET-3 Thickness gauge. The lenses were placed flat on the cutting mat and two long pieces were cut from around the centre of the flat lens using a razor blade. These cut pieces were put into saline solution in a sample dish. The sample was loaded on to clamps using tweezers carefully going for the top clamp first and then the bottom. The gap in between the clamps was set at 10 mm using a calibrated vernier caliper. Once set, the "Reset GL" button was pressed to set the Gauge Length". Once the sample was loaded, the balance load was set to 0.000N and the test was started using the console controls.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

TABLE 1

Comparative Examples for PEG-SiIM compositions based on silicone macromer 1580

| Composition | Wt of PEG6088 (g) | Wt of PEG 3350 (g) | Wt of PEG1000 (g) | Wt of TEG (g) | Wt of Silicone macromer 1580 (g) | Weight of Desmodur w (g) | Weight of DBTDL (g) | Wt of BHA (g) | Modulus (MPa) | DK (Barrer) | EWC (%) | Visual appearance of hydrated sample |
|---|---|---|---|---|---|---|---|---|---|---|---|---|
| 1 | 20.000 | | | 7.9060 | 10.0074 | 15.778 | 0.0416 | 0.0576 | | | | opaque |
| Wt % = | 37.18 | | | 14.69 | 18.60 | 29.33 | 0.0773 | 0.10 | | | | |
| Moles = | 3.2851 × 10$^{-3}$ | | | 0.0526 | 6.3337 × 10$^{-3}$ | 0.0601 | | | | | | |
| 3 | | 30.33 | | 13.56 | 14.1638 | 29.946 | 0.1000 | 0.1000 | | | | opaque |
| Wt % = | | 34.39 | | 15.37 | 16.05 | 33.95 | 0.11 | 0.11 | | | | |
| Moles = | | 0.0303 | | 0.0903 | 8.9644 × 10$^{-3}$ | 0.1141 | | | | | | |

TABLE 2

Comparative Examples for PEG -Si IM compositions based on silicone macromer DBE C25 (M wt = 3500 to 4500 = ~4000 mean)

| Composition | Wt of PEG 3350 (g) | Wt of PEG1000 (g) | Wt of PEG1500 (g) | Wt of PEG600 (g) | Wt of TEG (g) | Wt of Silicone macromer (DBEC25) (g) | Weight of Desmodur w (g) | Weight of DBTDL (g) |
|---|---|---|---|---|---|---|---|---|
| 1 |  |  |  | 10.073 | 12.751 | 6.672 | 26.279 | 0.1671 |
| Wt % = |  |  |  | 17.83 | 22.57 | 11.80 | 46.51 | 0.29 |
| Moles = |  |  |  | 0.0167 | 0.0849 | $1.668 \times 10^{-3}$ | 0.1001 |  |
| 5 |  | 10.0162 |  |  | 15.0408 | 8.1160 | 28.954 | 0.1976 |
| Wt % = |  | 15.91 |  |  | 23.89 | 12.89 | 46.00 | 0.31 |
| Moles = |  | 0.0100 |  |  | 0.1001 | $2.3 \times 10^{-3}$ | 0.1103 |  |
| 9 | 5.02 | 5.1 |  |  | 10.3678 | 7.3770 | 19.313 | 0.1252 |
| Wt % = | 10.52 | 10.69 |  |  | 21.73 | 15.46 | 40.48 | 0.26 |
| Moles = | $1.5 \times 10^{-3}$ | $5.1 \times 10^{-3}$ |  |  | 0.0690 | $1.84 \times 10^{-3}$ | 0.0735 |  |

| Composition | Wt of BHA (g) | Wt of RB4 (g) | PEG Dme 1000 (g) | EWC (%) | Visual appearance of hydrated sample |
|---|---|---|---|---|---|
| 1 | 0.5546 |  |  | 31.2 | opaque |
| Wt % = | 0.98 |  |  |  |  |
| Moles = |  |  |  |  |  |
| 5 | 0.6192 |  |  | 44.6 | opaque |
| Wt % = | 0.98 |  |  |  |  |
| Moles = |  |  |  |  |  |
| 9 | 0.4006 |  |  |  | Tyndall |
| Wt % = | 0.84 |  |  |  |  |
| Moles = |  |  |  |  |  |

TABLE 3

Comparative Examples for PEG -Si IM compositions

| Composition | PEG 600 (g) | PEG 1000 (g) | PEG 1500 (g) | PEG 2000 (g) | PEG 3350 (g) | PEG 5761 (g) | TEG (g) | PTMO 250 (g) | PTMO 650 (g) | DBE C25 (g) |
|---|---|---|---|---|---|---|---|---|---|---|
| 1 | 10.073 |  |  |  |  |  | 12.575 |  |  | 6.672 |
| 2 | 10.020 |  |  |  |  |  | 25.041 |  |  | 6.673 |
| 3 | 5.118 |  |  |  |  |  | 18.784 |  |  | 3.363 |
| 4 |  | 10.016 |  |  |  |  | 15.040 |  |  | 8.116 |
| 5 |  | 10.017 |  |  |  |  | 30.074 |  |  | 8.069 |
| 6 |  |  | 10.264 |  |  |  | 20.230 |  |  | 5.338 |
| *7 |  | 25.43 |  |  | 25.04 |  | 69.06 |  |  | 36.90 |
| *8 |  |  | 10.22 |  |  |  | 20.46 |  |  | 27.195 |
| *9 |  |  |  | 15.19 |  |  | 22.55 |  |  | 12.45 |
| 10 |  | 10.38 |  |  |  |  | 20.03 |  | 8.00 | 10.69 |
| *11 |  |  |  | 20.03 |  |  | 17.51 | 7.61 |  | 24.34 |
| *12 |  |  |  |  |  | 19.99 | 10.42 |  |  |  |
| *13 |  |  |  |  |  | 20.01 | 10.42 |  |  |  |

| Composition | Desmodur W (g) | MCR-C61 | DBE 821 (g) | Silicone (%) | Clarity On hydration | EWC (%) | Ocutec Ref |
|---|---|---|---|---|---|---|---|
| 1 | 26.279 |  |  | 4.75 | opaque | 31 | 1 |
| 2 | 48.276 |  |  | 2.93 | transparent | 22 | 2 |
| 3 | 35.074 |  |  | 2.12 | transparent | 4 | 3 |
| 4 | 28.954 |  |  | 5.17 | opaque | 44 | 5 |
| 5 | 55.307 |  |  | 3.34 | transparent | 33 | 7 |
| 6 | 36.807 |  |  | 2.9 | transparent | 39 | 8 |
| *7 | 129.38 |  |  | 5.0 | transparent | 47 | 10 |
| *8 | 39.18 |  |  | 10.6 | opaque | 47 | SiHy3 |
| *9 | 41.70 |  |  | 6.05 | opaque |  | SiHy19 |
| 10 | 41.32 |  |  | 5.32 | transparent |  | SiHy22 |

TABLE 3-continued

| | | | | | | | |
|---|---|---|---|---|---|---|---|
| Comparative Examples for PEG -Si IM compositions | | | | | | | |
| *11 | 36.80 | | | 11.0 | opaque | | SiHy26 |
| *12 | | 3.47 | | | Opaque | 53 | SiHy34P |
| *13 | | | 24.98 | 4.8 | opaque | 72 | SiHy52B |

*PEG dme1000 was used in thisl compositions at 2 wt %
DBTDL was used as catalyst at 0.1 wt % in all compositions
DBE821 Dimethylsiloxane-Ethylene Oxide Block/Graft Copolymers
DBE C25 Ethylene oxide-dimethylsiloxane-ethylene oxide block polymer
MCR C61 Poly dimethysiloxane dicarbinol(mono) terminated

TABLE 4

| | Raw Materials | | | | | | | | | | | | | | | Analysis | | | | |
|---|---|---|---|---|---|---|---|---|---|---|---|---|---|---|---|---|---|---|---|---|
| Composition | PEG 200 (g) | PEG 2100 (g) | PEG 3350 (g) | TMP (g) | DBE C25 (g) | DBE 712 (g) | Silmer OH Di 10 | Silsurf 1010 | Silsurf 1508 | Silsurf 2510 | Desmodur W (g) | HDI (g) | BHA (g) | DBTDL (g) | PEG dme 1000 | Modulus (MPa) | EWC (%) | DK (Barrer) | Ocutec Ref. |
| 1 | 8.556 | | | | | | 21.390 | 20.000 | | | 19.615 | | 0.700 | 0.079 | | | | | SiHy313 |
| Wt % = | 12.30 | | | | | | 30.75 | 28.75 | | | 28.20 | | 1.00 | 0.10 | | | | | |
| Mols × 10⁻³ | 42.78 | | | | | | 21.39 | 10.70 | | | 74.87 | | | | | | | | |
| 2 | 8.556 | 2.099 | | | | | 21.390 | 20.000 | | | 20.870 | | 0.696 | 0.069 | | | 10.6 | | SiHy314 |
| Wt % = | 11.73 | 2.88 | | | | | 29.34 | 27.43 | | | 28.62 | | 0.696 | 0.10 | | | | | |
| Mols × 10⁻³ | 42.78 | 1.00 | | | | | 21.39 | 10.70 | | | 75.86 | | | | | | | | |
| 3 | 8.556 | 2.246 | | 0.287 | | | 21.390 | 20.000 | | | 21.478 | | 0.696 | 0.069 | | | 9.5 | | SiHy315 |
| Wt % = | 11.57 | 3.04 | | 0.39 | | | 28.92 | 27.04 | | | 29.04 | | 1.00 | 0.10 | | | | | |
| Mols × 10⁻³ | 42.78 | 1.07 | | 2.14 | | | 21.39 | 10.70 | | | 78.07 | | | | | | | | |
| 4 | 3.209 | 5.615 | | 0.144 | 10.695 | | 10.695 | 10.000 | 10.695 | | 11.489 | | 0.696 | 0.069 | | | | | SiHy316 |
| Wt % = | 5.13 | 8.98 | | 0.23 | 10.10 | | 17.10 | 15.99 | 17.10 | | 18.37 | | 1.00 | 0.10 | | | | | |
| Mols × 10⁻³ | 16.04 | 2.67 | | 1.07 | 2.67 | | 10.70 | 5.35 | 5.35 | | 43.85 | | | | | | | | |
| 5 | 10.695 | 22.460 | | 0.144 | | | | 10.000 | 21.390 | 37.433 | | 15.771 | 0.491 | 0.049 | | | | | SiHy317 |
| Wt % = | 9.07 | 19.05 | | 0.12 | | | | 8.48 | 18.14 | 31.75 | | 13.38 | 1.00 | 0.10 | | | | | |
| Mols × 10⁻³ | 53.48 | 10.70 | | 1.07 | | | | 5.35 | 10.70 | 12.48 | | 93.76 | | | | | | | |
| 6 | 10.695 | 22.460 | | 0.144 | | | | 20.000 | 21.390 | 37.433 | | 16.670 | 0.491 | 0.049 | | | | | SiHy318 |
| Wt % = | 8.3D | 17.44 | | 0.11 | | | | 15.53 | 16.61 | 29.06 | | 12.94 | 1.00 | 0.10 | | | | | |
| Mols × 10⁻³ | 53.48 | 10.70 | | 1.07 | | | | 10.70 | 10.70 | 12.48 | | 99.11 | | | | | | | |
| 7 | 5.000 | 26.250 | | 0.671 | | | | 20.000 | 45.000 | 37.500 | 50.435 | | 0.928 | 0.093 | | | | | SiHy319 |
| Wt % = | 2.70 | 14.20 | | 0.36 | | | | 10.82 | 24.34 | 20.29 | 27.28 | | 1.00 | 0.10 | | | | | |
| Mols × 10⁻³ | 25.00 | 12.50 | | 5.00 | | | | 25.00 | 22.500 | 75.00 | 192.50 | | | | | | | | |
| 8 | 2.500 | 13.125 | | 0.335 | | | | 10.000 | 22.500 | 18.750 | | 16.399 | 0.232 | 0.023 | | | | | SiHy320 |
| Wt % = | 2.99 | 15.70 | | 0.40 | | | | 11.96 | 26.91 | 22.43 | | 19.61 | 1.00 | 0.10 | | | | | |
| Mols × 10⁻³ | 12.50 | 6.25 | | 2.30 | | | | 12.50 | 25.00 | 37.50 | | 97.50 | | | | | | | |
| 9 | 2.500 | 13.125 | | 0.335 | | | | 10.000 | 22.500 | 18.750 | 25.545 | | 0.232 | 0.023 | | | | | SiHy321 |
| Wt % = | 2.70 | 14.15 | | 0.36 | | | | 10.78 | 24.26 | 20.21 | 27.46 | | 1.00 | 0.10 | | | | | |
| Mols × 10⁻³ | 12.50 | 6.25 | | 2.50 | | | | 12.50 | 25.00 | 37.50 | 72.50 | | | | | | | | |
| 10 | 2.500 | 13.125 | | 0.335 | | | | 10.000 | 22.500 | 18.750 | | 16.399 | 0.232 | 0.023 | | | | | SiHy322 |
| Wt % = | 2.99 | 15.70 | | 0.40 | | | | 11.96 | 26.91 | 22.43 | | 19.61 | 1.00 | 0.10 | | | | | |
| Mols × 10⁻³ | 12.50 | 6.25 | | 2.50 | | | | 12.50 | 25.00 | 37.50 | | 97.50 | | | | | | | |
| 11 | 2.000 | 2.000 | 2.000 | | | | | 10.000 | 14.000 | 10.000 | | 7.222 | 0.420 | 0.042 | | | 54.9 | | SiHy332 |
| Wt % = | 4.14 | 4.14 | 4.14 | | | | | 20.69 | 28.96 | 20.69 | | 17.26 | 1.00 | 0.10 | | | | | |
| Mols × 10⁻³ | 10.00 | 0.95 | 0.60 | | | | | 12.50 | 15.56 | 10.00 | | 49.61 | | | | | | | |
| 12 | 2.000 | 2.000 | 4.000 | | | | | 10.000 | 14.000 | 10.000 | | 8.866 | 0.349 | 0.035 | | | 30.9 | 65.1 | SiHy333 |
| Wt % = | 3.93 | 3.93 | 7.86 | | | | | 19.66 | 27.52 | 19.66 | | 17.43 | 1.00 | 0.10 | | | | | |
| Mols × 10⁻³ | 10.00 | 0.95 | 1.19 | | | | | 12.50 | 15.56 | 10.00 | | 52.71 | | | | | | | |
| 13 | 2.000 | 2.000 | 6.000 | | | | | 10.000 | 14.000 | 10.000 | | 8.972 | 0.349 | 0.035 | | | | | SiHy334 |
| Wt % = | 3.78 | 3.78 | 11.33 | | | | | 18.88 | 26.43 | 18.88 | | 16.94 | 1.00 | 0.10 | | | | | |
| Mols × 10⁻³ | 10.00 | 0.95 | 1.79 | | | | | 12.50 | 15.56 | 10.00 | | 53.34 | | | | | | | |
| 14 | 2.000 | 2.000 | 4.000 | | | | | 15.000 | 20.000 | 10.000 | | 11.147 | 0.327 | 0.033 | | | 27.7 | 148.7 | SiHy335 |
| Wt % = | 3.12 | 3.12 | 6.24 | | | | | 23.38 | 31.18 | 15.59 | | 17.38 | 1.00 | 0.10 | | | | | |
| Mols × 10⁻³ | 10.00 | 0.95 | 1.19 | | | | | 18.75 | 22.22 | 10.00 | | 66.27 | | | | | | | |
| 15 | 2.000 | 2.000 | 6.000 | | | | | 15.000 | 20.000 | 10.000 | | 11.253 | 0.327 | 0.33 | | | 33.6 | 118.0 | SiHy336 |
| Wt % = | 3.02 | 3.02 | 9.06 | | | | | 22.64 | 30.19 | 15.09 | | 16.98 | 1.00 | 0.10 | | | | | |
| Mols × 10⁻³ | 10.00 | 0.95 | 1.79 | | | | | 18.75 | 22.22 | 10.00 | | 66.90 | | | | | | | |

TABLE 4-continued

| Composition | Raw Materials | | | | | | | | | | | | | | | Analysis | | | |
|---|---|---|---|---|---|---|---|---|---|---|---|---|---|---|---|---|---|---|---|
| | PEG 200 (g) | PEG 2100 (g) | PEG 3350 (g) | TMP (g) | DBE C25 (g) | DBE 712 (g) | Silmer OH Di 10 | Silsurf 1010 | Silsurf 1508 | Silsurf 2510 | Desmodur W (g) | HDI (g) | BHA (g) | DBTDL (g) | PEG dme 1000 | Modulus (MPa) | EWC (%) | DK (Barrer) | Ocutec Ref. |
| 16 | 2.000 | 2.000 | 4.000 | | | | | 15.000 | 20.000 | 10.000 | | 10.617 | 0.327 | 0.033 | | 1.34 | 24.7 | 105.1 | SiHy337 |
| Wt % = | 3.14 | 3.14 | 6.29 | | | | | 23.58 | 31.44 | 15.72 | | 16.69 | 1.00 | 0.10 | | | | | |
| Mols × 10⁻³ | 10.00 | 0.95 | 1.19 | | | | | 18.75 | 22.22 | 10.00 | | 63.12 | | | | | | | |
| 17 | 2.000 | 3.000 | 6.000 | | | | | 15.000 | 25.000 | 25.000 | | 11.451 | 0.437 | 0.044 | | | 44.4 | | SiHy339 |
| Wt % = | 2.29 | 3.43 | 6.86 | | | | | 17.15 | 28.59 | 28.59 | | 13.09 | 1.00 | 0.10 | | | | | |
| Mols × 10⁻³ | 10.00 | 1.43 | 1.79 | | | | | 18.75 | 27.78 | 8.33 | | 68.08 | | | | | | | |
| 18 | 3.000 | 3.000 | 8.000 | | | | | 10.000 | 40.000 | 30.000 | | 13.584 | 0.520 | 0.052 | | | 47.0 | | SiHy341 |
| Wt % = | 2.81 | 2.81 | 7.51 | | | | | 9.38 | 37.53 | 28.15 | | 12.74 | 1.00 | 0.10 | | | | | |
| Mols × 10⁻³ | 10.00 | 1.43 | 2.39 | | | | | 12.50 | 44.44 | 10.00 | | 80.76 | | | | | | | |
| 19 | 2.000 | 2.000 | 4.000 | | | | | 15.000 | 20.000 | 10.000 | | 10.617 | 0.636 | 0.064 | 1.272 | | | | SiHy347 |
| Wt % = | 3.14 | 3.14 | 6.29 | | | | | 23.58 | 31.44 | 15.72 | | 16.69 | 1.00 | 0.10 | 2.00 | | | | |
| Mols × 10⁻³ | 10.00 | 0.95 | 1.19 | | | | | 18.75 | 22.22 | 10.00 | | 63.12 | | | | | | | |
| 20 | 2.000 | 2.000 | 4.000 | | | | | 15.000 | 20.000 | 10.000 | | 10.617 | 0.636 | 0.064 | 2.545 | 1.17 | 32.8 | | SiHy348 |
| Wt % = | 3.14 | 3.14 | 6.29 | | | | | 23.58 | 31.44 | 15.72 | | 16.69 | 1.00 | 0.10 | 4.00 | | | | |
| Mols × 10⁻³ | 10.00 | 0.95 | 1.19 | | | | | 18.75 | 22.22 | 10.00 | | 63.12 | | | | | | | |
| 21 | 2.000 | 2.000 | 4.000 | | | | | 15.000 | 20.000 | 10.000 | | 10.617 | 0.636 | 0.064 | 3.817 | 0.50 | 35.6 | | SiHy358 |
| Wt % = | 3.14 | 3.14 | 6.29 | | | | | 23.58 | 31.44 | 15.72 | | 16.69 | 1.00 | 0.10 | 6.00 | | | | |
| Mols × 10⁻³ | 10.00 | 0.95 | 1.19 | | | | | 18.75 | 22.22 | 10.00 | | 63.12 | | | | | | | |
| 22 | 2.000 | 2.000 | 4.000 | | | | | 15.000 | 20.000 | 10.000 | | 10.086 | 0.636 | 0.064 | 3.817 | | 39.3 | 109.0 | SiHy349 |
| Wt % = | 3.14 | 3.14 | 6.29 | | | | | 23.58 | 31.44 | 15.72 | | 15.86 | 1.00 | 0.10 | 6.00 | | | | |
| Mols × 10⁻³ | 10.00 | 0.95 | 1.19 | | | | | 18.75 | 22.22 | 10.00 | | 59.96 | | | | | | | |
| 23 | 2.000 | 2.000 | 4.000 | | | | | 15.000 | 20.000 | 10.000 | | 9.555 | 0.636 | 0.064 | 3.817 | | 35.2 | 85.5 | SiHy360 |
| Wt % = | 3.14 | 3.14 | 6.29 | | | | | 23.58 | 31.44 | 15.72 | | 15.02 | 1.00 | 0.10 | 6.00 | | | | |
| Mols × 10⁻³ | 10.00 | 0.95 | 1.19 | | | | | 18.75 | 22.22 | 10.00 | | 63.12 | | | | | | | |
| 24 | 2.000 | 2.000 | 4.000 | | | | | 15.000 | 20.000 | 10.000 | | 9.024 | 0.636 | 0.064 | 3.817 | | 40.6 | 111.4 | SiHy361 |
| Wt % = | 3.14 | 3.14 | 6.29 | | | | | 23.58 | 31.44 | 15.72 | | 14.19 | 1.00 | 0.10 | 6.00 | | | | |
| Mols × 10⁻³ | 10.00 | 0.95 | 1.19 | | | | | 18.75 | 22.22 | 10.00 | | 53.65 | | | | | | | |
| 25 | 2.000 | 2.000 | 4.000 | | | | | 15.000 | 20.000 | 10.000 | | 8.494 | 0.636 | 0.064 | 3.817 | | 54.1 | | SiHy362 |
| Wt % = | 3.14 | 3.14 | 6.29 | | | | | 23.58 | 31.44 | 15.72 | | 13.35 | 1.00 | 0.10 | 6.00 | | | | |
| Mols × 10⁻³ | 10.00 | 0.95 | 1.19 | | | | | 18.75 | 22.22 | 10.00 | | 50.50 | | | | | | | |
| 26 | 2.000 | 2.000 | 4.000 | | | | | 15.000 | 20.000 | 10.000 | | 9.024 | 0.636 | 0.064 | | 0.92 | | | SiHy368 |
| Wt % = | 3.14 | 3.14 | 6.29 | | | | | 23.58 | 31.44 | 15.72 | | 14.55 | 1.00 | 0.10 | | | | | |
| Mols × 10⁻³ | 10.00 | 0.95 | 1.19 | | | | | 18.75 | 22.22 | 10.00 | | 63.12 | | | | | | | |
| 27 | 1.00 | 1.000 | 1.000 | | | 0.620 | | 24.18 | 32.15 | 16.12 | | 4.512 | 0.310 | 0.031 | | | | | SiHy369 |
| Wt % = | 3.22 | 3.22 | 6.45 | | | 2.00 | | 24.18 | 32.25 | 16.12 | | 14.55 | 1.00 | 0.10 | | | | | |
| Mols × 10⁻³ | 10.00 | 0.48 | 0.60 | | | | | 9.38 | 11.11 | 5.00 | | 31.56 | | | | | | | |
| 28 | 1.000 | 1.000 | 2.000 | | | 1.241 | | 7.500 | 10.000 | 5.000 | | 4.512 | 0.310 | 0.031 | | | | | SiHy370 |
| Wt % = | 3.22 | 3.22 | 6.45 | | | 4.00 | | 24.18 | 32.25 | 16.12 | | 14.55 | 1.00 | 0.10 | | | | | |
| Mols × 10⁻³ | 10.00 | 0.48 | 0.60 | | | | | 9.38 | 11.11 | 5.00 | | 31.56 | | | | | | | |
| 29 | 1.000 | 1.000 | 2.000 | | | 1.861 | | 7.500 | 10.000 | 5.000 | | 4.512 | 0.310 | 0.031 | | | | | SiHy371 |
| Wt % = | 3.22 | 3.22 | 6.45 | | | 6.00 | | 24.18 | 32.25 | 16.12 | | 14.55 | 1.00 | 0.10 | | | | | |
| Mols × 10⁻³ | 10.00 | 0.48 | 0.60 | | | | | 9.38 | 11.11 | 5.00 | | 31.56 | | | | | | | |
| 30 | 2.000 | 2.000 | 4.000 | | | | | 15.000 | 20.000 | 10.000 | | 9.024 | 0.620 | 0.062 | 2.40 | 0.87 | | | SiHy372 |
| Wt % = | 3.22 | 3.22 | 6.45 | | | | | 24.18 | 32.25 | 16.12 | | 14.55 | 1.00 | 0.10 | 4.00 | | | | |
| Mols × 10⁻³ | 10.00 | 0.95 | 1.19 | | | | | 18.75 | 22.22 | 10.00 | | 63.12 | | | | | | | |

SiHy 313 to SiHy 318 Mwt values used of 1870, 2000 and 3000 respectively. Changed to Mn values of 800, 900 and 1000 from SiHy319 onwards

TABLE 5

Steam Sterilisation

| Polymer | Pre-Autoclave | | | Post-Autoclave | | |
|---|---|---|---|---|---|---|
| | Diameter | BC | CT | Diameter | BC | CT |
| SiHy 337E | 14.45 | 9.1 | 0.115 | 14.55 | 9.05 | 0.101 |
| SiHy 337F | 14.7 | 9.15 | 0.120 | 14.7 | 9.45 | 0.105 |
| SiHy 359 | 14.9 | 9.5 | 0.117 | 14.9 | 9.5 | 0.127 |

UV Sterilisation

| Polymer | Pre-PUV | | | Post-PUV | | |
|---|---|---|---|---|---|---|
| | Diameter | BC | CT | Diameter | BC | CT |
| SiHy 337E | 14.5 | 9.05 | 0.113 | 14.6 | 9.05 | 0.115 |
| SiHy 337F | 14.6 | 9.25 | 0.111 | 14.6 | 9.45 | 0.122 |
| SiHy 359 | 14.7 | 9.5 | 0.102 | 14.7 | 9.5 | 0.117 |

Focus remained good before and after sterilisation in each case

TABLE J

| Material | *Mn | % Si | Mass | No. of Mols | wt % | % Si |
|---|---|---|---|---|---|---|
| Silsurf 1010 | 1692.56 | 47 | 15 | 0.0089 | 24.3042 | |
| Silsurf 1508 | 1761.66 | 54 | 20 | 0.0114 | 32.4055 | |
| Silsurf 2510 | 2462.15 | 60 | 10 | 0.0041 | 16.2028 | |
| PEG 200 | 200 | | 2 | 0.0100 | 3.2406 | |
| PEG 2100 | 2100 | | 2 | 0.0010 | 3.2406 | |
| PEG 3350 | 3350 | | 4 | 0.0012 | 6.4811 | |
| HDI | 168.2 | | 8.718 | 0.0518 | 14.1253 | |
| DBTDL | 0.100% | | 0.0617 | | | |
| BHA | 1.000% | | 0.6172 | | | |
| Total | | | 61.718 | | | 38.64 |

TABLE K detailing the properties of the composition detailed in Table J

| Measurement | Results |
|---|---|
| Dk (Ocutec) Barrer | 64.5 |
| Dk (Adjusted) (Barrer) | 92.1 |
| Dk $R^2$ | 0.99 |
| Modulus (MPa) | 1.12 +/− 0.3 |
| Tear Strength (g/mm) | 8.89 |
| UV Transmittance at 550 nm (%) | 97.3 +/− 0.6 |
| Contact Angle (°) | 90.6 +/− 4.7 |
| Water Content (%) | 40.09 +/− 1.8 |

The Mn values provided in respective tables were used for calculations of the components of the composition detailed therein.

TABLE 6

| Material | Mn | % Si | Mass | No. of Mols | wt % | % Si |
|---|---|---|---|---|---|---|
| Silsurf 1010 | 1641.56 | 47 | 15 | 0.0091 | 24.2749 | |
| Silsurf 1508 | 1756.14 | 54 | 20 | 0.0114 | 32.3665 | |
| Silsurf 2510 | 2462.15 | 60 | 10 | 0.0041 | 16.1833 | |
| PEG 200 | 200 | | 2 | 0.0100 | 3.2367 | |
| PEG 2100 | 2100 | | 2 | 0.0010 | 3.2367 | |
| PEG 3350 | 3350 | | 4 | 0.0012 | 6.4733 | |
| HDI | 168.2 | | 8.792 | 0.0523 | 14.2288 | |
| DBTDL | 0.100% | | 0.0618 | | | |
| DBE 712 | 15.000% | | 9.2688 | | | |
| Total | | | 61.792 | | | 38.60 |

TABLE 7 detailing the properties of the composition of Table 6

| Measurement | Results |
|---|---|
| Dk (Ocutec) Barrer | 75.72 |
| Dk (Adjusted) (Barrer) | 111.84 |
| Dk $R^2$ | 0.99 |
| Modulus (MPa) | 0.64 +/− 0.07 |
| Tear Strength (g/mm) | 8.89 |
| UV Transmittance at 550 nm (%) | 96.91 +/− 0.55 |
| Contact Angle (°) | 55.55 +/− 4.36 |
| Water Content (%) | 41.10 +/− 0.64 |

TABLE 8

| Material | Mn | % Si | Mass | No. of Mols | wt % | % Si |
|---|---|---|---|---|---|---|
| Silsurf 1010 | 1641.56 | 47 | 15 | 0.0091 | 24.2749 | |
| Silsurf 1508 | 1756.14 | 54 | 20 | 0.0114 | 32.3665 | |
| Silsurf 2510 | 2462.15 | 60 | 10 | 0.0041 | 16.1833 | |
| PEG 200 | 200 | | 2 | 0.0100 | 3.2367 | |
| PEG 2100 | 2100 | | 2 | 0.0010 | 3.2367 | |
| PEG 3350 | 3350 | | 4 | 0.0012 | 6.4733 | |
| HDI | 168.2 | | 8.792 | 0.0523 | 14.2288 | |
| DBTDL | 0.100% | | 0.0618 | | | |
| DBE 712 | 20.000% | | 12.3585 | | | |
| Total | | | 61.792 | | | 38.60 |

TABLE 9 detailing properties of the composition of Table 8

| Measurement | Results |
|---|---|
| Dk (Ocutec) Barrer | 78.10 |
| Dk (Adjusted) (Barrer) | 116.09 |
| Dk $R^2$ | 0.98 |
| Modulus (MPa) | 0.78 +/− 0.13 |
| Tear Strength (g/mm) | 6.59 |
| UV Transmittance at 550 nm (%) | 97.65 +/− 0.16 |
| Contact Angle (°) | 52.97 +/− 2.41 |
| Water Content (%) | 41.64 +/− 0.65 |

TABLE 10

| Material | Mn | % Si | Mass | No. of Mols | wt % | % Si |
|---|---|---|---|---|---|---|
| Silsurf 1010 | 1641.56 | 47 | 15 | 0.0091 | 24.2749 | |
| Silsurf 1508 | 1756.14 | 54 | 20 | 0.0114 | 32.3665 | |
| Silsurf 2510 | 2462.15 | 60 | 10 | 0.0041 | 16.1833 | |
| PEG 200 | 200 | | 2 | 0.0100 | 3.2367 | |
| PEG 2100 | 2100 | | 2 | 0.0010 | 3.2367 | |
| PEG 3350 | 3350 | | 4 | 0.0012 | 6.4733 | |
| HDI | 168.2 | | 8.792 | 0.0523 | 14.2288 | |
| DBTDL | 0.100% | | 0.0618 | | | |
| PEGdme 1000 | 5-20% | | | | | |
| Total | | | 61.792 | | | 38.60 |

TABLE 11

| Material | Mn | % Si | Mass | No. of Mols | wt % | % Si |
|---|---|---|---|---|---|---|
| Silsurf 1010 | 1641.56 | 47 | 15 | 0.0091 | 24.2749 | |
| Silsurf 1508 | 1756.14 | 54 | 20 | 0.0114 | 32.3665 | |
| Silsurf 2510 | 2462.15 | 60 | 10 | 0.0041 | 16.1833 | |
| PEG 200 | 200 | | 2 | 0.0100 | 3.2367 | |
| PEG 2100 | 2100 | | 2 | 0.0010 | 3.2367 | |
| PEG 3350 | 3350 | | 4 | 0.0012 | 6.4733 | |
| HDI | 168.2 | | 8.792 | 0.0523 | 14.2288 | |
| DBTDL | 0.100% | | 0.0618 | | | |
| A008AC-UP | 5-20% | | | | | |
| Total | | | 61.792 | | 38.60 | |

TABLE 12 detailing properties of the composition of Table 11

| Measurement | Results |
|---|---|
| Dk (Ocutec) Barrer) | 56.36 |
| Dk (Adjusted) (Barrer) | 78.32 |
| Dk $R^2$ | 0.99 |
| Modulus (MPa) | 0.57 +/− 0.15 |
| Tear Strength (g/mm) | |
| UV Transmittance at 550 nm (%) | 97.54 |
| Contact Angle (°) | 47.43 +/− 1.52 |
| Water Content (%) | 39.61 +/− 1.07 |

TABLE 13

| Material | Mn | % Si | Mass | No. of Mols | wt % | % Si |
|---|---|---|---|---|---|---|
| Silsurf 1010 | 1641.56 | 47 | 22.5 | 0.0137 | 54.8453 | |
| PEG 200 | 200 | | 3 | 0.0150 | 7.3127 | |
| PEG 2100 | 2100 | | 3 | 0.0014 | 7.3127 | |
| PEG 3350 | 3350 | | 6 | 0.0018 | 14.6254 | |
| HDI | 168.2 | | 6.525 | 0.0388 | 15.9039 | |
| DBTDL | 0.100% | | 0.0410 | | | |
| A008AC-UP | 5-20% | | | | | |
| Total | | | 41.025 | | 25.78 | |

TABLE 14 detailing properties of the composition of Table 13

| Measurement | Results |
|---|---|
| Dk (Ocutec) Barrer) | 51.45 |
| Dk (Adjusted) (Barrer) | 70.18 |
| Dk $R^2$ | 0.99 |
| Modulus (MPa) | 0.59 +/− 0.11 |
| Tear Strength (g/mm) | |
| UV Transmittance at 550 nm (%) | |
| Contact Angle (°) | 54.06 +/− 7.14 |
| Water Content (%) | 61.05 +/− 1.14 |

TABLE 15

| Material | Mn | % Si | Mass | No. of Mols | wt % | % Si |
|---|---|---|---|---|---|---|
| Silsurf 1010 | 1641.56 | 47 | 22.5 | 0.0137 | 42.1673 | |
| Silsurf 1508 | 1756.14 | 54 | 10 | 0.0057 | 18.7410 | |
| PEG 200 | 200 | | 3 | 0.0150 | 5.6223 | |
| PEG 2100 | 2100 | | 3 | 0.0014 | 5.6223 | |
| PEG 3350 | 3350 | | 6 | 0.0018 | 11.2446 | |
| HDI | 168.2 | | 8.859 | 0.0527 | 16.6024 | |
| DBTDL | 0.100% | | 0.0534 | | | |
| A008AC-UP | 0-20% | | | | | |
| Total | | | 53.359 | | 29.94 | |

TABLE X

| Material | Mn | % Si | Mass | Mass (*6.3) | Actual (g) | No. of Mols | No. of Mols (x10-3) | wt % | % Si |
|---|---|---|---|---|---|---|---|---|---|
| Silsurf 2510 | 2259.364 | 60 | 22 | 138.6 | 138.6 | 0.0097 | 9.7373 | 52.2622 | |
| PEG 200 | 200 | | 6 | 37.8 | 37.82 | 0.0300 | 30.0000 | 14.2533 | |
| PEG 6000 | 5767 | | 1.5 | 9.45 | 9.46 | 0.0003 | 0.2601 | 3.5633 | |
| PEG 3350 | 3350 | | 0.5 | 3.15 | 3.16 | 0.0001 | 0.1493 | 1.1878 | |
| DPG | 134.17 | | 0.7 | 4.41 | 4.41 | 0.0052 | 5.2173 | 1.6629 | |
| TMP | 134.17 | | 0.6 | 3.78 | 3.7900 | 0.0045 | 4.4719 | 1.4253 | |
| DMDI | 262.5 | | 13.3955 | | 13.4001 | 0.0521 | 52.0718 | 31.8216 | |
| DBTDL | 0.05% | | 0.0210 | 0.132600714 | 0.1278 | | | | |
| DBE-712 | 0.00% | 35 | 0.0000 | | | | | | |
| Total | | | 42.0955 | | | | | | 31.36 |

TABLE Y

| Composition | SBSiHy 89 + DBE-712 wt % | Contact Angle (°) |
|---|---|---|
| SBSiHy 89 | 0 | 86.44 +/− 1.95 |
| SBSiHy 90 | 2 | 74.20 +/− 1.77 |
| SBSiHy 91 | 5 | 66.30 +/− 6.06 |
| SBSiHy 92 | 10 | 52.42 +/− 3.00 |
| SBSiHy 93 | 15 | 43.78 +/− 5.86 |
| SBSiHy 94 | 20 | 38.56 +/− 3.15 |

TABLE 16

| Low Si Material | Mn | % Si | Mass | Mass | Mass (*4.5) | Actual | No. of Mols | Mol % | wt % | % Si |
|---|---|---|---|---|---|---|---|---|---|---|
| Silsurf 1010 | 1887.6 | 47 | 0.18 | 1.8000 | 8.10 | | 0.0001 | 0.9% | 1.0417 | |
| PEG 6000 | 6000 | 0 | 2 | 20.0000 | 90.00 | | 0.0003 | 0.9% | 11.5743 | |
| PEG 600 | 600 | | 10.1163 | 101.1630 | 455.23 | | 0.0169 | 46.0% | 58.5443 | |
| TEG | 150.17 | | 0.00 | 0.0000 | 0.00 | | 0.0000 | 0.0% | 0.0000 | |
| TMP | 134.17 | | 0.1131 | 1.1310 | 5.09 | | 0.0008 | 2.3% | 0.6545 | |
| DES W | 262.5 | | 4.870 | 48.7033 | | | 0.0186 | 50.6% | 28.1852 | |
| DBTDL | 0.05% | | 0.0086 | 0.0864 | 0.39 | | 0.0367 | | | |
| Total | | | 17.280 | 172.8837 | | | | | | 0.49 |

| Code | Master batch weight | Actual | PEG DME 1000 | Actual | Des W | Actual | % Si |
|---|---|---|---|---|---|---|---|
| B601 (1% PEG DME 1000) | 37.23 | | 0.408 | | 14.61 | | 0.48 |
| B602 (2% PEG DME 1000) | 37.23 | | 0.816 | | 14.61 | | 0.48 |
| B603 (3% PEG DME 1000) | 37.23 | | 1.224 | | 14.61 | | 0.48 |

100% NCO

TABLE 17

| Low Si Material | Mn | % Si | Mass | Mass | Mass (*4.5) | Actual | No. of Mols | Mol % | wt % | % Si |
|---|---|---|---|---|---|---|---|---|---|---|
| Silsurf 1010 | 1887.6 | 47 | 14 | 0.4308 | 1.94 | | 0.0074 | | 0.8101 | |
| PEG 6000 | 6000 | 0 | 600 | 18.4615 | 83.08 | | 0.1000 | 3.1% | 34.7179 | |
| PEG 3350 | 3350 | | 640 | 19.6923 | 88.62 | | 0.1910 | 5.9% | 37.0325 | |
| TEG | 150.17 | | 200.00 | 6.1538 | 27.69 | | 1.3318 | 40.8% | 11.5726 | |
| TMP | 134.17 | | 0 | 0.0000 | 0.00 | | 0.0000 | 0.0% | 0.0000 | |
| MDI | 168.2 | | 274.214 | 8.4374 | | | 1.6303 | 50.0% | 15.8669 | |
| DBTDL | 0.05% | | 0.8641 | 0.0266 | 0.12 | | 3.2606 | | | |
| Total | | | 1728.214 | 53.2024 | | | | | | 0.38 |

| Code | Master batch weight | Actual | HDI | Actual | Syringes | % Si | Autoclave |
|---|---|---|---|---|---|---|---|
| B598 (125% MDI) | 44.76 | | 10.55 | | 2 | 0.38 | |
| B599 (130% MDI) | 44.76 | | 10.97 | | 2 | 0.38 | |
| B600 (140% MDI) | 44.76 | | 11.81 | | 2 | 0.38 | |

125-140% Methylene diisocyanate indicates that MDI is 25 to 40% in excess of 1:1 NCO:OH stoichiometry
MDI—Methylene Diisocyanate
Si—Siloxane

TABLE 18

| Low Si Material | Mn | % Si | Mass | Mass | Mass (*4.3) | Actual | No. of Mols | Mol % | wt % | % Si |
|---|---|---|---|---|---|---|---|---|---|---|
| Silsurf 1010 | 1887.6 | 47 | 14 | 0.4308 | 1.94 | 1.941 | 0.0074 | | 0.7439 | |
| PEG 6000 | 6000 | 0 | 600 | 18.4615 | 83.08 | 83.0808 | 0.1000 | 3.1% | 31.8818 | |
| PEG 3350 | 3350 | | 640 | 19.6923 | 88.62 | 88.6209 | 0.1910 | 5.9% | 34.0073 | |
| TEG | 150.17 | | 200.00 | 6.1538 | 27.69 | 27.7 | 1.3318 | 40.8% | 10.6273 | |
| TMP | 134.17 | | 0 | 0.0000 | 0.00 | | 0.0000 | 0.0% | 0.0000 | |
| DMDI | 262.5 | | 427.950 | 13.1677 | | | 1.6303 | 50.0% | 22.7397 | |
| DBTDL | 0.05% | | 0.9410 | 0.0290 | 0.13 | 0.1330 | 3.2606 | | | |
| Total | | | 1881.950 | 57.9351 | | | | | | 0.35 |

| Code | Master batch weight | Actual | TMP | Actual | DES W | Actual | RCM Moulds | % Si | % TMP |
|---|---|---|---|---|---|---|---|---|---|
| B595 | 44.77 | 44.779 | 0.45 | 0.459 | 14.49 | 14.301 | 36 | 0.34 | 0.75 |
| B596 | 44.77 | 44.781 | 0.55 | 0.5508 | 14.79 | 14.908 | 36 | 0.32 | 0.92 |
| B597 | 44.77 | 44.778 | 0.65 | 0.6517 | 15.06 | 15.087 | 36 | 0.31 | 1 |

100% NCO indicates 1:1 NCO:OH stoichiometry 36% moulds for testing
DMDI—Desmodur W

TABLE 19

| Low Si Material | Mn | % Si | Mass | Mass | Mass (*9) | Actual | No. of Mols | Mol % | wt % | % Si |
|---|---|---|---|---|---|---|---|---|---|---|
| Silsurf 1010 | 1887.6 | 47 | 14 | 0.2154 | 1.51 | 1.527 | 0.0074 |  | 0.9309 |  |
| PEG 6000 | 6000 | 0 | 600 | 9.2308 | 64.62 | 64.6242 | 0.1000 | 2.5% | 39.8936 |  |
| PEG 3350 | 3350 |  | 640 | 9.8462 | 68.92 | 68.9223 | 0.1910 | 4.9% | 42.5532 |  |
| TEG | 150.17 |  | 250.00 | 3.8462 | 26.92 | 26.942 | 1.6648 | 42.4% | 16.6223 |  |
| TMP | 134.17 |  | 0 | 0.0000 | 0.00 |  | 0.0000 | 0.0% | 0.0000 |  |
| HDI | 168.2 |  | 0.000 | 0.0000 |  |  | 1.9632 | 50.0% | 0.0000 |  |
| DBTDL | 0.05% |  | 0.7520 | 0.0116 | 0.08 |  | 3.9265 |  |  |  |
| Total |  |  | 1504.000 | 23.1500 |  | 0.0120 |  |  |  | 0.44 |

| Code | Master batch weight | Actual | MDI | Actual | % Si |
|---|---|---|---|---|---|
| B592 (110% MDI) | 46.306 | 46.294 | 11.177 | 11.265 | 0.35 |
| B593 (120% MDI) | 46.306 | 46.324 | 12.193 | 12.226 | 0.35 |
| B594 (130% MDI) | 46.306 | 46.307 | 13.209 | 13.241 | 0.35 |

110-130% Methylene diisocyanate
110% indicates that MDI is 10% in excess of 1:1 NCO:OH stoichiometry

TABLE 20

| Low Si Material | Mn | % Si | Mass | Mass | Mass (*4.3) | Actual | No. of Mols | Mol % | wt % | % Si |
|---|---|---|---|---|---|---|---|---|---|---|
| Silsurf 1010 | 1887.6 | 47 | 14 | 0.2154 | 1.94 | 1.98 | 0.0074 |  | 0.6933 |  |
| PEG 6000 | 6000 | 0 | 600 | 9.2308 | 83.08 | 83.08 | 0.1000 | 2.5% | 29.7125 |  |
| PEG 3350 | 3350 |  | 640 | 9.8462 | 88.62 | 88.623 | 0.1910 | 4.9% | 31.6934 |  |
| TEG | 150.17 |  | 250.00 | 3.8462 | 34.622 | 34.622 | 1.6648 | 42.4% | 12.3802 |  |
| TMP | 134.17 |  | 0 | 0.0000 | 0.00 |  | 0.0000 | 0.0% | 0.0000 |  |
| DMDI | -262.5 |  | 515.351 | 7.9285 |  |  | 1.9632 | 50.0% | 25.5206 |  |
| DBTDL | 0.05% |  | 1.0097 | 0.0155 | 0.14 | 0.1420 | 3.9265 |  |  |  |
| Total |  |  | 2019.351 | 31.0825 |  |  |  |  |  | 0.33 |

| Code | Master batch weight | Actual | TMP | Actual | DES W | Actual | RCM Moulds | % Si | % TMP |
|---|---|---|---|---|---|---|---|---|---|
| B589 | 46.3 | 46.321 | 0.55 | 0.5519 | 19.1 | 19.17 | 36 | 0.31 | 1.66 |
| B590 | 46.3 | 45.297 | 0.65 | 0.6505 | 19.68 | 19.71 | 36 | 0.3 | 1.95 |
| B591 | 46.3 | 45.298 | 0.75 | 0.7491 | 20.28 | 20.643 | 36 | 0.3 | 2.2 |

100% NCO indicates 1:1 NCO:OH stoichiometry

TABLE 21

| Low Si Material | Mn | % Si | Mass | Mass | Mass (*9) | Actual | No. of Mols | Mol % | wt % | % Si |
|---|---|---|---|---|---|---|---|---|---|---|
| Silsurf 1010 | 1887.6 | 47 | 14 | 0.2154 | 1.51 | 1.52 | 0.0074 |  | 0.8922 |  |
| PEG 6000 | 6000 | 0 | 600 | 9.2308 | 64.62 | 64.62 | 0.1000 | 4.4% | 38.2358 |  |
| PEG 3350 | 3350 |  | 640 | 9.8462 | 68.92 | 68.92 | 0.1910 | 8.4% | 40.7849 |  |
| TEG | 150.17 |  | 125.00 | 1.9231 | 13.46 | 13.46 | 0.8324 | 36.8% | 7.9658 |  |
| TMP | 134.17 |  | 0 | 0.0000 | 0.00 |  | 0.0000 | 0.0% | 0.0000 |  |
| HDI | 168.2 |  | 190.209 | 2.9263 |  |  | 1.1309 | 50.0% | 12.1213 |  |
| DBTDL | 0.05% |  | 0.7846 | 0.0121 | 0.08 | 0.0880 | 2.2617 |  |  |  |
| Total |  |  | 1569.209 | 24.1538 |  |  |  |  |  | 0.42 |

| Code | Master batch weight | Actual | HDI | Actual | Syringes | % Si | Autoclave |
|---|---|---|---|---|---|---|---|
| B586 (110%) | 42.455 | 42.446 | 6.44 | 6.48 | 2 | 0.42 | Quick Gelling |
| B587 (130%) | 42.455 | 42.461 | 7.61 | 7.618 | 2 | 0.42 | Yes |
| B588 (150%) | 42.455 | 42.452 | 8.78 | 8.748 | 2 | 0.42 | Yes |

110-150% Methyene Diisocyanate indicates that MDI is 10 to 50%in excess of 1:1 NCO:OH stoichiometry

TABLE 22

| Low Si Material | Mn | % Si | Mass | Mass | Mass (*9) | Actual | No. of Mols | Mol % | wt % | % Si |
|---|---|---|---|---|---|---|---|---|---|---|
| Silsurf 1010 | 1887.6 | 47 | 14 | 0.2154 | 1.94 | 1.94 | 0.0074 | | 0.8354 | |
| PEG 6000 | 6000 | 0 | 600 | 9.2308 | 83.08 | 83.081 | 0.1000 | 4.4% | 35.8028 | |
| PEG 3350 | 3350 | | 640 | 9.8462 | 88.62 | 88.622 | 0.1910 | 8.4% | 38.1896 | |
| TEG | 150.17 | | 125.00 | 1.9231 | 17.31 | 17.318 | 0.8324 | 36.8% | 7.4589 | |
| TMP | 134.17 | | 0 | 0.0000 | 0.00 | | 0.0000 | 0.0% | 0.0000 | |
| DMDI | 262.5 | | 296.849 | 4.5669 | | | 1.1309 | 50.0% | 17.7133 | |
| DBTDL | 0.05% | | 0.8379 | 0.0129 | 0.12 | 0.1290 | 2.2617 | | | |
| Total | | | 1675.849 | 25.7952 | | | | | | 0.39 |

| Code | Master batch weight | Actual | TMP | Actual | DES W | Actual | RCM Moulds | % Si | % TMP | |
|---|---|---|---|---|---|---|---|---|---|---|
| B582 | 42.455 | 42.45 | 0.86 | 0.8651 | 11.66 | 11.72 | 36 | 0.38 | 1.5 | |
| B583 (MDI) | 42.455 | 42.455 | 0.86 | 0.8609 | 9.11 | 9.121 | 36 | 0.38 | 1.5 | Quick Gelling |
| B584 | 42.455 | 42.447 | 1.3 | 1.3016 | 12.97 | 13.063 | 36 | 0.36 | 2.1 | |
| B585 | 42.455 | 42.457 | 1.72 | 1.7242 | 14.19 | 14.337 | 36 | 0.35 | 3 | |

100% NCO indicates 1:1 NCO:OH ratio

TABLE 23

| Low Si Material | Mn | % Si | Mass | Mass | Mass (*4.3) | Actual | No. of Mols | Mol % | wt % | % Si |
|---|---|---|---|---|---|---|---|---|---|---|
| Silsurf 1010 | 1887.6 | 47 | 14 | 0.2154 | 1.94 | 1.949 | 0.0074 | | 0.7630 | |
| PEG 6000 | 6000 | 0 | 600 | 9.2308 | 83.08 | 83.088 | 0.1000 | 2.5% | 32.7010 | |
| PEG 3350 | 3350 | | 640 | 9.8462 | 88.62 | 88.624 | 0.1910 | 4.9% | 34.8811 | |
| TEG | 150.17 | | 250.00 | 3.8462 | 34.62 | 34.618 | 1.6648 | 42.4% | 13.6254 | |
| TMP | 134.17 | | 0 | 0.0000 | 0.00 | | 0.0000 | 0.0% | 0.0000 | |
| DMDI | 168.5 | | 330.806 | 5.0893 | | | 1.9632 | 50.0% | 18.0295 | |
| DBTDL | 0.05% | | 0.9174 | 0.0141 | 0.13 | 0.1310 | 3.9265 | | | |
| Total | | | 1834.806 | 28.2419 | | | | | | 0.36 |

| Code | Master batch weight | Actual | TMP | Actual | DES W | Actual | RCM Moulds | % Si | % TMP |
|---|---|---|---|---|---|---|---|---|---|
| B578 | 46.3 | 46.312 | 0.86 | 0.8656 | 18.38 | 18.447 | 36 | 0.31 | 1.5 |
| B579 (MDI) | 46.3 | 46.298 | 0.86 | 0.8611 | 11.8 | 11.85 | 36 | 0.23 | 1.5 |
| B580 | 46.3 | 46.306 | 1.3 | 1.3 | 19.66 | 19.712 | 36 | 0.3 | 2.1 |
| B581 | 46.3 | 46.299 | 1.72 | 1.7218 | 20.92 | 20.978 | 36 | 0.29 | 3 |

100% NCO indicates 1:1 NCO:OH ratio

TABLE 24

| Low Si Material | Mn | % Si | Mass | Mass | Mass (*4.3) | Actual | No. of Mols | Mol % | wt % | % Si |
|---|---|---|---|---|---|---|---|---|---|---|
| Silsurf 1010 | 1887.6 | 47 | 14 | 0.2154 | 0.9262 | 0.9544 | 0.0074 | | 0.4986 | |
| PEG 6000 | 6000 | 0 | 600 | 9.2308 | 39.6923 | 39.6918 | 0.1000 | 1.3% | 21.3700 | |
| PEG 3350 | 3350 | | 640 | 9.8462 | 42.3385 | 42.3369 | 0.1910 | 2.5% | 22.7947 | |
| TEG | 150.17 | | 536.8682 | 8.2595 | 35.5159 | 35.8235 | 3.5751 | 46.1% | 19.1215 | |
| TMP | 134.17 | | 0 | 0.0000 | 0.0000 | | 0.0000 | 0.0% | 0.0000 | |
| DMDI | 262.5 | | 1016.802 | 15.6431 | | | 3.8735 | 50.0% | 36.2151 | |
| DBTDL | 0.05% | | 1.4038 | 0.0216 | 0.0929 | 0.0950 | 7.7471 | | | |
| Total | | | 2807.670 | 43.2165 | | | | | | 0.23 |

| Code | Master batch weight | Actual | TMP | Actual | DES W | Actual | RCM Moulds | % Si | % TMP |
|---|---|---|---|---|---|---|---|---|---|
| B574 | 27.574 | 27.574 | 0 | 0 | 15.64 | 15.718 | 36 | 0.23 | 0 |
| B575 | 27.574 | 27.577 | 0.108 | 0.113 | 15.96 | 15.995 | 36 | 0.23 | 0.25 |
| B576 | 27.574 | 27.569 | 0.2154 | 0.218 | 16.28 | 16.36 | 36 | 0.23 | 0.5 |
| B577 | 27.574 | 27.526 | 0.43 | 0.431 | 16.91 | 16.95 | 36 | 0.23 | 1 |

100% NCO indicates 1:1 NCO:OH ratio

TABLE 25

| Low Si Material | Mn | % Si | Mass | Mass | Mass (*4.3) | Actual | No. of Mols | Mol % | wt % | % Si |
|---|---|---|---|---|---|---|---|---|---|---|
| Silsurf 1010 | 1887.6 | 47 | 14 | 0.2154 | 0.9262 | | 0.0074 | | 0.4938 | |
| PEG 6000 | 6000 | 0 | 600 | 9.2308 | 39.6923 | | 0.1000 | 1.3% | 21.1624 | |
| PEG 3350 | 3350 | | 640 | 9.8462 | 42.3385 | | 0.1910 | 2.4% | 22.5733 | |
| TEG | 150.17 | | 536.8682 | 8.2595 | 35.5159 | | 3.5751 | 45.4% | 18.9357 | |
| TMP | 134.17 | | 7 | 0.1077 | 0.4631 | | 0.0522 | 0.7% | 0.2469 | |
| DMDI | 262.5 | | 1037.345 | 15.9592 | | | 3.9518 | 50.2% | 36.5879 | |
| DBTDL | 0.05% | | 1.4176 | 0.0218 | | 0.0938 | 7.8775 | | | |
| Total | | | 2835.213 | 43.6405 | | | | | | 0.23 |

| Code | Master batch weight | Actual | TMP | Actual | DES W | Actual | RCM Moulds | % Si | % TMP |
|---|---|---|---|---|---|---|---|---|---|
| B570 | 45.56 | | 0 | | 15.64 | | 36 | 0.23 | 0 |
| B571 | 45.56 | | 0.108 | | 15.96 | | 36 | 0.23 | 0.25 |
| B572 | 45.56 | | 0.2154 | | 16.28 | | 36 | 0.23 | 0.75 |
| B573 | 45.56 | | 0.43 | | 16.91 | | 36 | 0.23 | 1.5 |

100% NCO indicates 1:1 NCO:OH ratio

TABLE 26

| Batch | EWC % | EWC SD | Modulus Mpa | Modulus SD | Tear Strength g/mm | Comments |
|---|---|---|---|---|---|---|
| B580 (Table 23) | 59.90 | 0.56 | 2.31 | 0.42 | 19.86 | |
| B581 (Table 23) | 57.79 | 0.24 | 2.84 | 0.12 | 21.236 | |
| B582 (Table 22) | 74.68 | 0.65 | 0.87 | 0.12 | | |
| B584 (Table 22) | 65.80 | 0.33 | 1.52 | 0.10 | | |
| B585 (Table 22) | 61.80 | 2.37 | 2.42 | 0.12 | | |
| B587 (Table 21) | 75.28 | 0.74 | | | | |
| B589 (Table 20) | 75.28/68.68 | 0.74/0.24 | | | | Double tested for EWC |
| B590 (Table 20) | 67.15 | 0.33 | | | | |
| B591 (Table 20) | 67.63 | 0.27 | | | | |
| B593 (Table 19) | 74.50 | 0.91 | | | | |
| B594 (Table 19) | 64.38 | 1.50 | | | | |
| B598 (Table 17) | 69.45 | 0.69 | | | | |

The invention claimed is:

1. A polyurethane xerogel prepared from a mixture comprising:
   (a) at least one isocyanate;
   (b) at least one silicone containing compound of formula Jii:

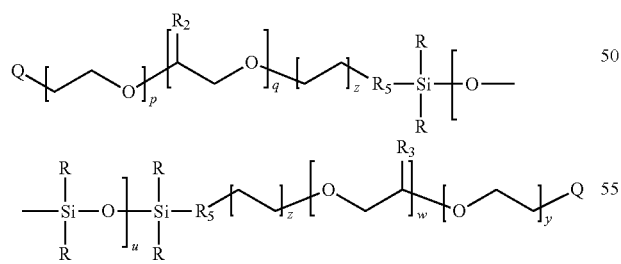

Formula Jii where each R independently represents a hydrocarbyl group or H;
each $R_2$, $R_3$, and $R_5$ group represents a hydrocarbyl group;
p represents an integer from 1 to 40;
q represents an integer from 1 to 40;
z is an integer from 1 to 50;
u is an integer from 1 to 100;
w is an integer from 1 to 40;
y is an integer from 1 to 40; and
each Q group independently represents a COOH, OH, SH, $NH_2$, NHR or NCO group;
   (c) optionally at least one chain extender comprising one or more of COOH, OH, SH, and $NH_2$ terminal groups;
   (d) optionally one or more PEG compounds; and
   (e) a polyfunctional compound having an average functionality greater than 2, comprising COOH, OH, SH, $NH_2$, NHR and/or NCO functional groups where R represents an alkyl group;
   wherein the reactants are reacted under substantially anhydrous conditions,
   wherein at least 95 wt % of the reactants in the mixture have an average functionality of 2 or less, and
   wherein the polyurethane xerogel has a silicone content of over 25 wt %.

2. A polyurethane xerogel of claim 1 wherein the chain extender is a diol, in particular of formula D,

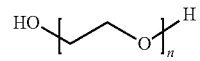

D wherein n is an integer from 1 to 25.

3. A polyurethane hydrogel which comprises the polyurethane xerogel of claim 1 in hydrated form.

4. A process for preparing a polyurethane xerogel, said process comprising:
preparing a mixture comprising
(a) at least one isocyanate;
(b) at least one silicone containing compound of formula Jii:

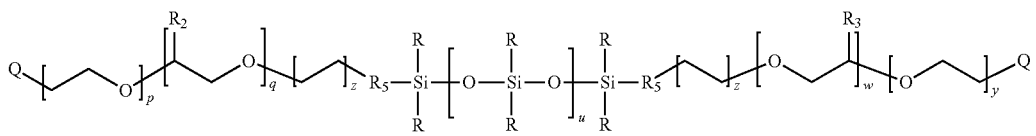

Formula Jii where each R independently represents a hydrocarbyl group or H;
each $R_2$, $R_3$, and $R_5$ group represents a hydrocarbyl group;
p represents an integer from 1 to 40;
q represents an integer from 1 to 40;
z is an integer from 1 to 50;
u is an integer from 1 to 100;
w is an integer from 1 to 40;
y is an integer from 1 to 40; and
each Q group independently represents a COOH, OH, SH, $NH_2$, NHR or NCO group;
(c) at least one chain extender comprising one or more of COOH, OH, SH, and $NH_2$ terminal groups;
(d) optionally one or more PEG compounds; and
(e) a polyfunctional compound having an average functionality greater than 2, comprising COOH, OH, SH, $NH_2$, NHR and/or NCO functional groups where R represents an alkyl group and
wherein at least 95 wt % of the reactants in the mixture have an average functionality of 2 or less, and
(ii) reacting the mixture formed in step (i) under substantially anhydrous conditions to form a polyurethane xerogel wherein the polyurethane xerogel has a silicone content of over 25 wt %.

5. A polyurethane xerogel obtainable by the process of claim 4.

6. A process for preparing a polyurethane hydrogel, said process comprising preparing a polyurethane xerogel according to claim 4, and hydrating said polyurethane xerogel with an aqueous medium to form a polyurethane hydrogel.

7. A polyurethane hydrogel obtained by the process of claim 6.

8. The process of claim 4, wherein the polyurethane xerogel is in the form of a moulded article, and said process further comprises the step of:
processing the polyurethane xerogel to form the moulded article.

9. A process for preparing a polyurethane hydrogel in the form of a moulded article, said process comprising preparing a polyurethane xerogel in the form of a moulded article according to claim 8, and hydrating said moulded article with an aqueous medium to form a polyurethane hydrogel.

10. A process according to claim 9 wherein the moulded article is in the form of an ophthalmic device such as a contact lens.

11. A contact lens comprising a polyurethane xerogel according to claim 1.

12. A xerogel as claimed in claim 1 comprising one silicone containing compound of formula C, and one to three silicone containing compounds of formula Jii

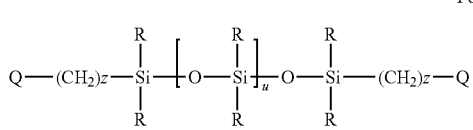

Formula C where each R group independently represents a hydrocarbyl group or H;
z is an integer from 1 to 50;
u is an integer from 1 to 100; and
each Q group independently represents a COOH, OH, SH, $NH_2$, NHR or NCO group.

13. A xerogel as claimed in claim 1 wherein the at least one silicone containing compound of formula Jii has a number average molecular weight of less than 3000.

14. A xerogel as claimed in claim 1, wherein at least 99 wt % of the reactants in the mixture have an average functionality of 2 or less.

15. A polyurethane xerogel of claim 1 wherein the chain extender is a PEG compound having a number average molecular weight of 100 to 500.

16. A xerogel as claimed in claim 15 wherein the chain extender is triethylene glycol (TEG) or tetraethylene glycol (TTEG).

17. A polyurethane xerogel prepared from a mixture comprising:
(a) at least one isocyanate;
(b) at least one silicone containing compound(s) of formula Ji:

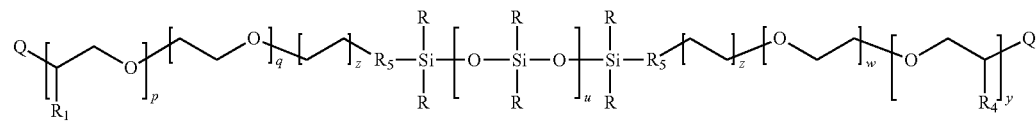

Formula Ji where each R independently represents a hydrocarbyl group or H;

each $R_1$, $R_4$ and $R_5$ group represents a hydrocarbyl group;

where p represents an integer from 1 to 40;

q represents an integer from 1 to 40;

z is an integer from 1 to 50;

u is an integer from 1 to 100;

w is an integer from 1 to 40;

y is an integer from 1 to 40; and each Q group independently represents a COOH, OH, SH, $NH_2$, NHR or NCO group;

(c) optionally at least one chain extender comprising one or more of COOH, OH, SH, and $NH_2$ terminal groups;

(d) optionally one or more PEG compounds; and (e) a polyfunctional compound having an average functionality greater than 2, comprising COOH, OH, SH, $NH_2$, NHR and/or NCO functional groups where R represents an alkyl group;

wherein the reactants are reacted under substantially anhydrous conditions, wherein at least 95 wt % of the reactants in the mixture have an average functionality of 2 or less, and wherein the polyurethane xerogel has a silicone content of over 25 wt %.

* * * * *